US012809999B2

(12) United States Patent
Kanderal

(10) Patent No.: US 12,809,999 B2
(45) Date of Patent: Nov. 24, 2026

(54) SCALABLE, DATA-DRIVEN DIGITAL MARKETPLACE PROVIDING A STANDARDIZED SECURED DATA SYSTEM FOR INTERLINKING SENSITIVE RISK-RELATED DATA, AND METHOD THEREOF

(71) Applicant: Swiss Reinsurance Company Ltd., Zürich (CH)

(72) Inventor: Jan Kanderal, Zürich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 85 days.

(21) Appl. No.: 18/464,000

(22) Filed: Sep. 8, 2023

(65) Prior Publication Data

US 2023/0418958 A1 Dec. 28, 2023

Related U.S. Application Data

(63) Continuation of application No. PCT/EP2022/082416, filed on Nov. 18, 2022.

(30) Foreign Application Priority Data

Nov. 18, 2021 (CH) ................................ 70577/2021

(51) Int. Cl.
*G06F 21/60* (2013.01)

(52) U.S. Cl.
CPC .................................. *G06F 21/606* (2013.01)

(58) Field of Classification Search
CPC ... G06F 21/606; G06Q 40/08; G06Q 10/0635
See application file for complete search history.

(56) References Cited

U.S. PATENT DOCUMENTS 11,263,337 B2 * 3/2022 DeLuca .................. G06F 21/53
2007/0043758 A1 2/2007 Bodin et al.

(Continued)

OTHER PUBLICATIONS

International Search Report mailed Mar. 27, 2023 in International Application No. PCT/EP2022/082416.

(Continued)

*Primary Examiner* — Trang T Doan
*Assistant Examiner* — Ethan V Vo
(74) *Attorney, Agent, or Firm* — Oblon, McClelland, Maier & Neustadt, L.L.P.

(57) ABSTRACT

Proposed is a scalable, data-driven digital market place and system providing a standardized data aggregator by a central digital platform for interlinking sensitive risk-related data, the scalable data-driven digital market place providing controlled data-driven and/or process-driven cross-data interaction between different units of the scalable data-driven digital market place and the central digital platform. The digital market place platform is based on an automated digital process for users centered around six areas with modular core and premium add-on processes. The first area provides automated loss analytics and automated programme optimization facilitating the understanding of loss trends and automated deriving of an optimized risk-transfer structure and/or programme. The second area provides automated property exposure management and automated visualization of property portfolio and risk exposures. The third area provides employee health risk-transfer structures and/or programmes facilitating automated analysis of complex impact of risks on employee health programs and/or risk-transfer structures. The forth area provides automated policy and/or certificate and/or exposure and/or claims management, inter alia, providing automated capturing and automated managing of risk-relevant data and documents. The fifth area provides automated supply chain resilience by (Continued)

automatically creating digital twins of production and supplier networks to be covered and/or fenced by risk mitigation. The sixth area provides automated sustainability solutions and/or automated compiling of sustainability metrics and tracking against NetZero.

17 Claims, 7 Drawing Sheets

(56) References Cited

U.S. PATENT DOCUMENTS

| | | | | |
|---|---|---|---|---|
| 2007/0118291 | A1* | 5/2007 | Carttar | G06Q 40/08 702/5 |
| 2009/0265193 | A1* | 10/2009 | Collins | G06Q 30/0185 901/46 |
| 2011/0137685 | A1* | 6/2011 | Tracy | G06Q 40/08 705/4 |
| 2014/0337086 | A1* | 11/2014 | Asenjo | G06F 3/0635 705/7.28 |
| 2017/0091870 | A1* | 3/2017 | Trainor | G08B 13/08 |
| 2019/0384870 | A1* | 12/2019 | Shiraishi | G06Q 40/08 |
| 2020/0118053 | A1* | 4/2020 | Chapin | G06Q 10/06315 |
| 2020/0404014 | A1* | 12/2020 | Pfleger de Aguiar | H04L 63/1408 |
| 2021/0133670 | A1* | 5/2021 | Cella | G06Q 10/10 |
| 2021/0248289 | A1 | 8/2021 | Fasano | |
| 2021/0272394 | A1* | 9/2021 | Cella | G06Q 40/08 |
| 2022/0036302 | A1* | 2/2022 | Cella | G06Q 10/06375 |
| 2022/0100182 | A1* | 3/2022 | Mehrotra | G06F 21/57 |

OTHER PUBLICATIONS

Hur, Junbeom, "Fine-grained data access control for distributed sensor networks", Wireless Networks,vol. 17, No. 5, Apr. 24, 2011 (Apr. 24, 2011), p. 1235-1249, XP055561831.

Munoz-Arcentales Andres et al., "Data Usage and Access Control in Industrial Data Spaces: Implementation Using Fiware", Sustainability, vol. 12, No. 9, May 9, 2020 (May 9, 2020), p. 3885, XP093030998.

Sarwar Kinza et al, "Lightweight, Divide-and-Conquer privacy-preserving data aggregation in fog computing", Future Generation Computer Systems, vol. 119, Jun. 1, 2021 (Jun. 1, 2021), p. 188-199, XP093031061.

* cited by examiner

SCALABLE, DATA-DRIVEN DIGITAL MARKETPLACE PROVIDING A STANDARDIZED SECURED DATA SYSTEM FOR INTERLINKING SENSITIVE RISK-RELATED DATA, AND METHOD THEREOF

CROSS-REFERENCE TO RELATED APPLICATIONS

This application is a continuation of and claims benefit under 35 U.S.C. § 120 to International Application No. PCT/EP2022/082416 filed on Nov. 18, 2022, which is based upon and claims the benefit of priority from Swiss Application No. 070577/2021, filed Nov. 18, 2021, the entire contents of each of which are incorporated herein by reference.

FIELD OF THE INVENTION

The present invention relates to digital modular platforms providing secured data interlinking for sensitive data, in particular sensitive risk-related data. It also relates to digital systems based on intelligent or smart technology intended to facilitate interaction between physical and the cyber worlds, such as digital twin technologies in order to achieve smart manufacturing, monitoring, steering or predicting present or future states of a physical object, as edifices, building constructions or property assets. All these systems try to cope with the challenges to automatically capture sensitive data for connecting the physical and cyber world to work intelligently.

BACKGROUND OF THE INVENTION

Digital data platforms, industrial 4.0 technologies, telematics-based technologies and smart sensory-based technologies, as wearables or smart house technologies, used to achieve smart manufacturing, real-time monitoring, steering and/or controlling of physical objects resulted in the phenomenon of big data, id est large, diverse, complex, and/or longitudinal data sets (including a great diversity of data types and formats from any kind of sensory or measuring devices, data sources, data storage, batch processing, message ingestions, stream processing, analytical data stores, analysis and reporting systems and electronic signal processing), which has a stark influence on data preprocessing, data processing and data security strategy making. An increase in levels of data and technological capabilities is redefining innovation, competition, and productivity. However, especially in the digital insurance technology and risk-transfer technology there is a need to transform digital distribution and provide technical solution on how to achieve this in the digital age. Therefore, one of the technical objects of the present invention is to provide a digital risk data platform and appropriate technologies for all risk market participants (Insured, Broker, Insurer, Risk Analysis providers, etc.).

Pandemic conditions caused by Covid-19 further accelerated the mentioned technical need, since the pandemic conditions have impacted almost all parts of individual lives to households, manner to work and the casual interactions as such, so that most people had to adapt to a new level of digitized life and work. Nevertheless, the biggest impact has been on the places of work where the coronavirus pandemic has accelerated the digital transformation—and exposed weaknesses in insurers' ability to respond to changing users and/or customer needs in an increasingly online world. Tactical distribution solutions are a good start but to compete with BigTech's leading customer experience and rivalling add-on services, traditional insurers must embrace a multi-channel approach in the creation of their digital customer interaction. Risk data and risk-cover distribution is in a technical challenging phase—data insights on consumer behavior coupled with holistic digital strategy further augmented channels to be able to stay relevant and grow. In summary, Covid-19 pandemic condition has accelerated the gradual pre-pandemic digital transformation and created new technical interaction structures, processing models and distribution networks that will change the way to interact in business for ever Many consumers have adapted their digital behavior due to the pandemic. In the US, for example, 58% of consumers indicated that they are spending more of their money online, 27% subscribed to at least one new digital streaming service, and 42% purchased more through mobile devices. For the insurer industry, the pandemic has exposed one of their greatest weaknesses: their digital capabilities. The insurance industry is still an industry with many forms to fill in and information that is shared by hand. It has also resisted implementing digital technologies unlike other industries. As digital adoption technically ramps up, insurers not only risk being left behind but could become obsolete with other companies offering insurance as an add-on service. An example for the impact of Covid-19 and the digital transformation is the motor risk-transfer technology. COVID-19 has generated the technical need for better understanding user damage exposure and provide automatically optimized customer service. In this way, the pandemic condition changed motor insurance requirements because of altered mobility needs. Several risk-transfer systems now provide refunds based on reduced motor vehicle use. However, another technical problem arising from the more digital way of working and interaction, comes with an increasing cyber-crime. Further, risk-transfer systems need to understand how people's exposures change to automatically tailor and personalize the risk-transfers that they truly need. Finally, it is an important technical requirement to provide a digital infrastructure that is able to scale up to meet changing customer expectations and demand. The pandemic merely accelerated their transformation, leaving them with the need to optimize their technical infrastructure. Thus, the risk-transfer technology has failed to meet this rise in expectations. Even simple insurance purchases require long questionnaires, lengthy assessments and channel-shifting, making it easier for BigTech interlopers. Tesla, for example, armed with real-time customer and vehicle information, started offering car insurance in specific cases in limited geographies in the US in 2019, and the company is reportedly expanding into China. In some instances, Tesla was able to offer prices 20-30% cheaper because of the data it had access to on both customer (driving) behavior and the vehicles. Data-driven automated business structures use data insights not just for efficiency reasons, but also for better customer experiences automatically and dynamically adapting to changing needs. Although many typical insurance systems cannot match the level of knowledge Tesla has on its vehicles and drivers, the expectation that they should be able to do so is there.

In addition, consumer experience is evolving as people become more familiar with digital online services and systems. Although digital offerings vary from insurer to insurer, in the early stages of the pandemic, companies either tried to upgrade their digital functionality or tried to build one. Insurers responded with very basic, almost firefighting, capabilities to emerging needs: online-first loss notification as a response to overloaded call centers or a payment gateway for online renewals. Although these rather tactical solutions are admirable steps in embracing the shift to a digital world, they are, at best, an emergency stop gap and a small piece of what should be a larger infrastructure shift. Consumers who use online platforms need a continuous user experience. The current basic level of expectation is an integrated, seamless customer journey. This offers the possibility of continued contextual interactions, which result in better data insights on consumer behavior. With these insights, the risk-transfer technology can create and improve their current products and risk-transfer structures and offer timely value-added and tailored services. This data-driven relationship loop is typically the foundation of the BigTech companies' success. It enables them to respond agilely, dynamically and automatically to new insights and continually improve their products and services, which generates more consumer trust and higher organic growth. Up-to-now, the risk-transfer technology was not yet able to build the digital infrastructure necessary for this type of interaction on all levels (Insured, Broker, Insurer, Risk Analysis providers, etc.).

The present invention contributes to both technical and practical strategic application and technical development by presenting a technical framework that provides the technical basis for normalized captured and interlinking of data and data services of a wide range of heterogenous providing parties, in particularly so that participating parties can gain access to a new extended range of data assets and interlinked data services, for example, allowing to better understand and manage risks they are facing, thereby providing the basis for reducing and optimizing their total cost of risk including cyber risk associated with possibly sensitive data. The invention further allows to identify how big data can improve operational or functional capabilities within organizations and can be a technical key component of innovative and disruptive strategies. Further, the present invention provides a digital risk data platform addressing al technical issues, particularly related to all technical requirements of handling risk-related data and measuring data for all risk market participants (Insured, Broker, Insurer, Risk Analysis providers, etc.).

It is to be mentioned, that a move to more digital online services doesn't erase brokers from the insurance business structure. COVID-19 may have halted face-to-face meetings, but virtual conferencing solutions such as MS Teams and Zoom can keep people connected. Many physical interactions, such as personal styling appointments, work meetings, even virtual dating, are successfully moving into the online sphere. Brokers, impartial advisors with detailed knowledge of insurance products, remain a vital component of the value chain. According to an Ernst & Young survey in Australia, 60% of insurers believe that brokers are still effective sales drivers. They offer a personal, customer-centric touch that insurance services generally lack. Complex risk-transfer and risk-cover structures—like health and life risk-transfer—still have relatively low online purchase rates in many markets. The current risk-transfer systems need to consider why consumers are attached to traditional approaches and how best to address their concerns to achieve a more dynamic, optimized technical-based approach. When consumers are faced with complex decisions, they seek sensitive, personalized and relevant answers to their questions. Currently, most of the available risk-transfer systems simply don't have the technical capabilities to offer this type of customer experience online. To get answers, consumers will channel shift and call, turn to a live chat function, or approach a call agent or broker. If they are still unable to find relevant, personal information, then they are likely to switch providers. This might change over time as bots become more naturally integrated, although they have a long way to go in developing new technical approaches and technical capability to act appropriately in complex interactions, such as digital marketplace systems.

Today, central to a large range of new technologies is the availability and accessibility of big data: large, diverse, complex, and/or longitudinal data sets generated from a variety of instruments, sensors, and/or computer-based signal transmissions or transactions. Across many industries, the use share of plunging resources into big data projects with aims to better monitor, measure, and manage the technologies in the hope of solving many of long-standing technical or operational issues. Manufacturing, engineering, data services and data analysis applications, as e.g. risk analysis and forecast/simulations, as big data fed digital twins, and virtually all other sectors are actively investing in the search for and development of new competitive advantages by such big data application resulting in more efficient processes and supply chains, or improved product offerings. Even the data search industry as Google or even the entertainment industry has jumped on the trend, as content creators like Netflix use big data to determine casting and storylines and sports teams employ analytics to gain an edge on the playing field.

Despite the obvious operational advantages of big data and the unified access to large and complex heterogenous data set, trends toward its use have created new technical challenges. The collection, storage, and analyses of data are of primary concern to the industry as they attempt to come to terms with the technical demands associated with such new capabilities. Even more importantly, industry and data providers pursuing big data need to define a strategy for how to leverage their capabilities successfully into an improved data handling.

In the last years, it became clear, that big data analysis and handling are the basis for the next wave of innovation, competition, and productivity. There are studies showing that the continued emergence of big data will have large-scale increases in technology, manufacturing, logistics, health care, risk and financial applications, and government, among other sectors, with an annual impact of nearly $300 billion in the medical industry alone. In light of such numbers and the potential technological influence of big data spanning all kind of industries and technologies, processing and accessibility of big data has caught the attention of almost every industry. As data continues to be produced in previously unfathomable quantities, digitization promises additional shifts to the technical landscape and further evolution of existing technologies.

Within this application, handling data means the technical process of collecting, storing, and transforming/processing (and analyzing) data. Four major technological issues, especially in data-driven digitalization, are driving the data handling process: issue 1: fast and often exponential increase in captured data, issue 2: how to accelerate speed in data pre-processing and processing, issue 3: special structures for optimized storage and querying of complex and unnormalized data structures, and issue 4 technically secure handling of sensitive and personal data. These technical problems are mirrored in the raise of technologies. In this context, the Internet of Things (IoT) technologies became an important framework. The Internet of Things (IoT) is a collective term for technologies of a global infrastructure within information societies. It makes it possible to network physical and virtual objects with each other and to let them work together through information and communication technologies. The Internet of Things produces an immense volume of data every day. Another aspect coming with growing data availability is the way data is available. The traditional association was structured data (in a relational database, maybe differentiated by dimensions and key figures). The newly collected data was digitally (or electronically) available but in an unstructured way.

Regarding risk-transfer and insurance technology, there was, in the early years of the digital revolution, typically nothing special about the kind and type of data for the insurance industry compared to other technology fields. However, in recent years, new data sources have emerged that are to the insurance technology more than just a new data source, in particular coming from wearables, smart and/or connected devices, telematics, wireless and wired sensor networks in marine, land and/or air-based, satellite or other space-based environment monitoring, and the Internet of Things. They allow real-time measuring data of complex interrelationships of event occurrences with an impact to risk exposed "object," be it a car, a house, or the health of an individual, to be obtained. It has to be explicitly noted that the term "risk-exposure" and "risk" is herein understood not as an abstract value associated with an abstract or administrative business method, but as a physical and technical measure and measurable quantity measuring the actual probability for the occurrence of an event in a future measuring time window (i.e. the measurably quantitatively forecasted occurrence frequency of events having a measurable physical impact to the "risk-exposed" object or individual) using technical sensory devices and/or measuring devices, as e.g. temperature sensors, daylight sensors, air-based or space-based sensory devices as optical sensory devices e.g. cameras etc. This individualized data, described above, have a large impact on the required insurance technology; it even changes the whole business model itself. The core idea of providing a risk cover relies to the pooling of different risk profiles into a common portfolio, and thereby lowering and calibrating the overall risk to a predefined threshold, sometimes referred to as risk appetite of a risk-transfer system or unit. With the new technologies, in the extreme scenario, personalized real-time data of the insured object (or subject) allows for precise predictions, leaving lower uncertainty and thus completely prevent the pooling. Even though the extreme scenario will most likely technological never be reached, an increase in the accuracy of the risk forecast by orders of magnitude is possible enough to radically change the risk-transfer technologies and businesses: loss of high-risk individuals and/or objects from the potential portfolio base and intense competition for the remaining low-risk individuals and/or objects. An insurance system that what to stay competitive to other systems has to adapt to the new situation. It has to learn how to include the modern data technologies in its business model and how to make use of the potential of Big Data and artificial intelligence for risk assessment, forecasts, and risk mitigation. One important technological part to achieve this is to provide the technical infrastructure allowing to gather the necessary data, automatically structure it, automatically extract risk-exposure relevant parameters and/or measures by allowing to access and share the risk-relevant data with the participants of the digital platform and the risk market (e.g. broker or insurers). Based on the data, provided by the digital infrastructure, risk-transfer system can den select risks for providing risk-transfers and trigger underwriting. The present invention creates technically new opportunities arising from individualized real-time data, the use large heterogenous data sources covering complex external, internal and/or environmental interrelationships. The present invention also allows to integrate and process heterogenous data from data aggregators, which provide some of the modern data sources.

There have been various technical approaches to data sources provided by integrated Industrial 4.0 technologies, or other data parameter values as location and value of an asset or a risk-exposed object as e.g. buildings, ships, planes, etc. or even things as product liability measures, legal entity classifications etc. and to achieve smart manufacturing, monitoring, steering and/or controlling of physical objects and/or individuals and/or risk-exposure data extraction. One of the technical challenges is to connect the physical and cyber world to machine-based intelligently. An approache is to map the physical object to a digital counter-part, which is known as digital twin (DT). Digital twin technology covers at least the components knowledge and data content, effect and functionality, and application domain. However, in the risk-related context, the prior art systems typically lack the awareness of its progress from the three aspects, inter alia due to the lack of missing connectivity and likability of the complex heterogenous data and its large amount. To fully utilize digital twin technology, the relations of the three components (i.e., content, effect, and application) should be assessable and calibratable in order to fill the gaps and defeats remaining. Further, prior art digital twin-technology fails to form a comprehensively connected technology in the field of risk forecast and risk mitigation technology, which is an often phenomenon for a technology that remains in its early stage of development.

Especially, in view of possible risk-exposures of objects or individuals, the autonomy and self-organizing properties of digital twin technology can substantially change the technical control and management of physical objects, such as assets, vehicles, or manufacturing systems etc. An automated system can achieve self-optimization when it can work independently, collect data, conduct analysis, negotiate with other machines, and provide suggestions. In addition, systems can communicate with humans and other machines. Smart homes, smart vehicles, or smart factories can also develop by employing DT that updates data and offers instruction for physical process. Through the virtual and physical integration of DTs, the prior art deficiencies in risk-transfer technology can probably be overcome, however, requiring an appropriate normalized databases, which is desperately missing at the moment for the complex data structures of environmental linked objects and/or individuals. Digital twins (DT) contain static and dynamic information, i.e. data and parameter values having a time dependence, and which can be represented e.g. by time-series of operational, physical and/or contextual parameter values. Thus, the static information can e.g. include geometric sizes, lists of materials, and procedures, whereas the dynamic information includes information on the structure/object/product/process life cycle that changes over time. DT is not a complete model of a physical object but a series of digital data and simulated models with different purposes. Specifically, DT represents a software structure that constructs physical systems. It obtains data from sensors, understands the system status, and responds to dynamic environmental changes. Moreover, DT provides intelligence at different levels to achieve the goal of smart manufacturing, smart controlling, smart steering, smart monitoring etc. The realization of DT consists of a physical structure (classification, composition units, and network structures), conditions or statuses (locations, temperatures, and pressures), situational context information (events in chronological order), and analysis engines (algorithms, deductions, and inference rules). Further, in technology, especially in the risk-transfer technology, it is often required to make assessment and/or predictions regarding the operation or future state of a real world physical system/object/individual, such as a physical asset, a construction, an electro-mechanical system or the like.

Thus, in summary, there is a need for a standardized digital system based on intelligent data processing technology and/or digital twin technology allowing to interconnect the various heterogenous data capturing systems coping with the challenges to interconnect heterogenous data flows from different systems and mutually connect the physical and cyber world to work intelligently, which, inter alia, defines the digital twin (DT) technology. Further, it would be desirable to provide systems and methods, in particular standardized usable systems and methods, to facilitate assessments and/or predictions for a physical system in an automatic and technically accurate manner.

SUMMARY OF THE INVENTION

It is an object of the invention to provide systems and methods, in particular standardized usable systems and methods to interconnect sensitive risk-relevant data together in a single secured data foundation, and to facilitate assessments and/or predictions for a physical system in an automatic and technically accurate manner. Further, the lack of a standardized data collection method for risk aspects of risk-exposed objects (i.e. individuals (i.e. living objects) or other physical objects (e.g. tangible or intangible assets) having a measurable probability of having a damage impact by the occurrence of a defined physical event, as a natural catastrophic event, as for example occurring flood events, earthquakes, storms, hurricanes, fire events etc. or accident events or if the object is a living object an illness etc.) is one of the largest inefficiencies and thus puts one of the larges technical challenges, the risk-transfer technology faces. Although field engineers collect hundreds of relevant data-points (rdp's) while visiting a location, data processing still is a highly manual and a text-heavy chore. Incumbents who have entered the digital era have handed-out tablets to their field staff. The core of the technical problem remains the upstream data-capturing and data-sharing and data-processing. Even when the tedious task of transferring hand-written text into a risk engineering database is finished, most if not all incumbents still struggle with the complexity of data and the core dilemma of automation vs data-integrity. Thus, it is a further object of the invention to provide a digital data-based standard market place and method able to cope with the high degree of hierarchy needed to cluster and structure securely collected sensitive and/or risk-related data comprising: (i) account data, (ii) location data, (iii) risk exposure data, (iv) contextual data, (v) operational data, (vi) structural data etc. In addition, although data is enriched and structured, this process is still mostly done in-house, for own underwriting purposes, but little is used for benchmarking or creating external customer value. Some incumbents are offering customer portals, which are almost always exclusive to the current lead insurer. Customers still face enormous hurdles, changing lead insurers, placing risk on the market for renewal and above all regaining full control of their risk landscape and its development over time. The lack of a standardize data-format also creates enormous inefficiencies internally at the customer as the various functions (i.e. procurement, controlling, asset management, financial office, enterprise risk management, etc.) lack an end-to-end data exchange format and the manual emailing of xlsx-spread-sheets and even the manual transfer of data-points are still normal practice. So, another major object of the present invention is to provide an open modular digital platform able to provide a standard for risk-related data capturing bringing the risk-relevant data of various systems and parties together in a single secured data foundation and allowing to interconnect and process said captured data. Once created, the digital twin remains the same over the lifetime of the real physical location, even beyond change of owner-ship, activity, etc. The digital platform should be directed to provide a new technical way of content provision, risk understanding/knowledge and mitigation and exposure quantification as well as risk communication, while having overlaps to fields such as digital programming and architecture development, automated client management, automated business plan development, automated contract negotiating.

According to the present invention, these objects are achieved particularly through the features of the independent claims. In addition, further advantageous embodiments follow from the dependent claims and the description.

According to the present invention, the abovementioned objects are particularly achieved by the scalable, data-driven digital market place and system providing a standardized secured data aggregator by a central digital platform for interlinking sensitive risk-related data, the scalable data-driven digital market place providing controlled data-driven and/or process-driven cross-data interaction between different units of the scalable data-driven digital market place and the central digital platform, and the units having associated heterogeneous data sources and/or data measuring or capturing devices and using one or more network-enabled devices to access the central digital platform by a secure network provided by the scalable, data-driven digital market place, in that each unit has an assigned authentication, authorization and group allocation within the open modular cross-data system providing a controlled network access to the central digital platform and a fenced data space of a persistence storage of the central digital platform for each of the units via the secure network, in that the central digital platform comprising a network-interface for secure bidirectional data transmission between the central digital platform and a unit, wherein all data transmissions and communications between a unit and the central digital platform are hosted in the fenced data space associated with the unit uploading and/or assessing data via the network-enabled devices of the unit and the network-interface for data preprocessing and processing by central digital platform, and in that the uploaded data are standardized and/or normalized and/or preprocessed by the central digital platform providing uniform access to each of the units to its data. Each unit can e.g. comprise defined unit-specific data- and process-access parameters and defined group-specific data- and process-access parameters, the groups within the hierarchical group allocation at least comprising insured unit and/or broker unit and/or insurer and/or risk analysis provider data- and process-access parameters.

The present invention has, inter alia the advantage that it provides an off-the-shelf data integration to seamlessly bring various exposure data sources together into a single secure data foundation. The invention allows to provide deeper insights by providing access to a range of standardized risk analyses and benchmarks to gain and/or trigger and/or operate actionable insights and trigger values for automated managing of risks or risk-driven systems. The system also provides an eased technical exchange with improved operational efficiency by accessing and sharing standardized and/or mutual normalized datasets, in particular measuring values, with different units and risk-transfer systems (e.g. during a renewal process). Further, the present invention has, inter alia the advantage that it overcomes the disadvantage of prior art system in fragmentation by providing pre-processing and compiling across different and heterogenous geographic and operational units with deviating history of type and kind of data capturing. Further the present system allows to cover and automate a large variety of up-to-now manual activities by automating projects which have been in the prior art systems lengthy and resource-intensive and thus costly processes. Further, the present invention allows to overcome the limitation of the prior art systems which rely typically data processing and analysis structures representing only a one-off snapshot which is difficult to reproduce in the future. With the present system, inter alia, relying on the sensors, communications, and computational simulation and/or modeling, it may be possible to consider multiple components of a system, each having its own micro-characteristics and not just average measures of a plurality of components associated with a production run or lot. According to some embodiments described herein, this data, in particular actual exposure data or forecasted exposure data, may be provided by a "digital twin" of a twinned physical system.

In an embodiment variant, the central digital platform comprises an automated digital process for automated loss analytics and automated process optimization and/or for providing parameter-based indication of present of future loss trends and/or automated structuring or assembling of optimized risk-transfer structures based on the captured values of the data transmission pipelines and/or the data streamings and/or the parameter values of one or more digital twin structures. The embodiment variant, inter alia, the advantage that it provides benchmarking claims experience against market. Further, it allows to leverage large loss scenarios to understand tail exposure. It also allow optimized use of captives.

In another embodiment variant, the central digital platform comprises automated property exposure management and automated visualization of property portfolio and risk exposures based on the captured values of the data transmission pipelines and/or the data streamings and/or the parameter values of one or more digital twin structures. The embodiment variant, inter alia, the advantage that it allows to automatedly detect potential aggregated exposures and losses. It further provides automated detection and recognition of possible impacts of natural catastrophic events. The system also allows an optimized enrichment process with data available internally of the inventive system. Finally, it allows to integrate and automatically generate data-driven risk engineering reports.

In an embodiment variant, the central digital platform comprises employee health risk-transfer structures and/or processes and/or programmes facilitating automated analysis of complex impact of risks on employee health programs and/or risk-transfer structures based on the captured values of the data transmission pipelines and/or the data streamings and/or the parameter values of one or more digital twin structures. The embodiment variant, inter alia, the advantage that it allows electronically supporting employer groups by automated identifying and/or detecting high risk/high-cost individuals. Further, it allows to facilitate and support cost planning and/or identifying optimal cost/quality treatments and/or automatically benchmarking and optimizing programme costs.

In an embodiment variant, the central digital platform provides automated policy and/or certificate and/or exposure and/or claims management by automated capturing and automated managing of risk-relevant data and documents via the data transmission pipelines and/or the data streamings and/or the parameter values of one or more digital twin structures. The embodiment variant, inter alia, the advantage that it allows easy integration with other digital systems and tools. Further, it allows to automatically detect, review and maintain risk information and alerts, which can be e.g. used for electronic signaling and steering of associated automated systems, as e.g. electronically triggered alarm systems. Finally, the invention allows to securely share relevant subset of risk data with other participating units.

In a further embodiment variant, the central digital platform provides automated supply chain resilience by automatically generating one or more digital twin structures of production and supplier networks to be covered and/or fenced by risk mitigation based on the captured values of the data transmission pipelines and/or the data streamings and/or the parameter values of one or more digital twin structures. The embodiment variant, inter alia, the advantage that it allows to perform cyber risk assessments on suppliers and/or receive event alerts across different risk domains and/or anticipate shipment delays based on port conditions.

Finally, in an embodiment variant, the central digital platform provides automated sustainability solutions and/or automated compiling of sustainability metrics and tracking against NetZero based on the captured values of the data transmission pipelines and/or the data streamings and/or the parameter values of one or more digital twin structures. The embodiment variant, inter alia, the advantage that it provides automated generation of a $CO_2$ emission footprint (production, supply chain, logistics etc.), further, it provides automated detection and recognition of the potential impact of climate change (e.g. providing reliable and robust measures for the physical and transitional risks).

BRIEF DESCRIPTION OF THE DRAWINGS

The present invention will be explained in more detail below relying on examples and with reference to these drawings in which:

FIG. 3 shows the digital individual/object replica 48, the digital twin 47, the digital ecosystem replica 46, the digital risk robot 46 and the digital twin 4 with its optional artificial intelligence 45 of a physical entity 3 in the inventive digital platform 1. In the digital platform 1 and digital twin 47, respectively, each physical individual/object 3 comprise its digital modelling structures 481, 482, 483, . . . , 48*i* and data. These modelling structures 481, 482, 483, . . . , 48*i* and data combined form a digital individual/object replica 48 of an individual/object 3. The digital individual/object replica 48 is then equipped with the three characteristics (1) simulation 471, (2) synchronization 472 with the physical individual/object 3, (3) active data acquisition 473, to form the digital twin 47. The digital risk twin 4 consist of all characteristics of the digital twin 47 as well as a digital risk robot 45 layer and optionally the artificial intelligence layer 41 to realize an autonomous digital platform 1. The digital risk robot 45 layer consists of its own digital modelling structures 461, 462, 463, . . . , 46*i* and data, where these modelling structures 461, 462, 483, . . . , 46*i* and data combined form a digital ecosystem replica 48 of the ecosystem 5 comprising the environmental interacting factors/entities and the interaction to other real-world individuals/objects 3. The digital risk twin 4, realized as an intelligent digital risk twin, can therefore implement machine learning algorithms on available models and data of the digital twin 47 and the digital risk robot 45 to optimize operation as well as continuously test what-if-scenarios. Having an intelligent digital risk twin 4 expands the digital risk robot 45 with self-x capabilities such as self-learning or self-healing, facilitating its inner data management as well as its autonomous communication with other digital risk twins 4.

FIGS. 3 and 4).

DETAILED DESCRIPTION OF THE PREFERRED EMBODIMENTS

Figure 1:
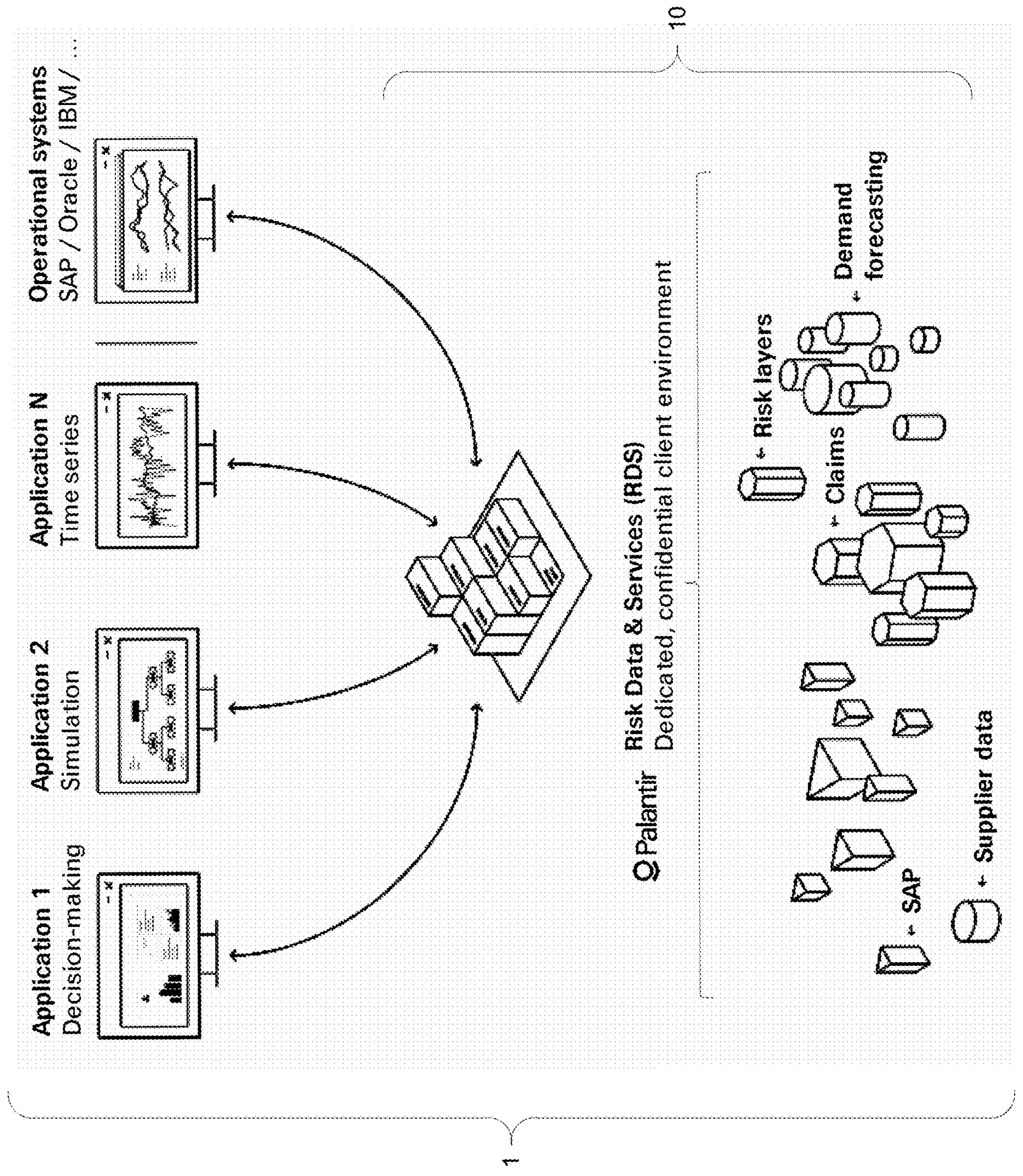
FIG. 1 shows a block diagrams illustrating schematically an exemplary open modular cross-data system 1 providing a standardized secured data aggregator enabled to unite different risk data sources of one or a plurality of users in a single location and thus providing a technical basis for a range of applications with various services.
Figure 2:
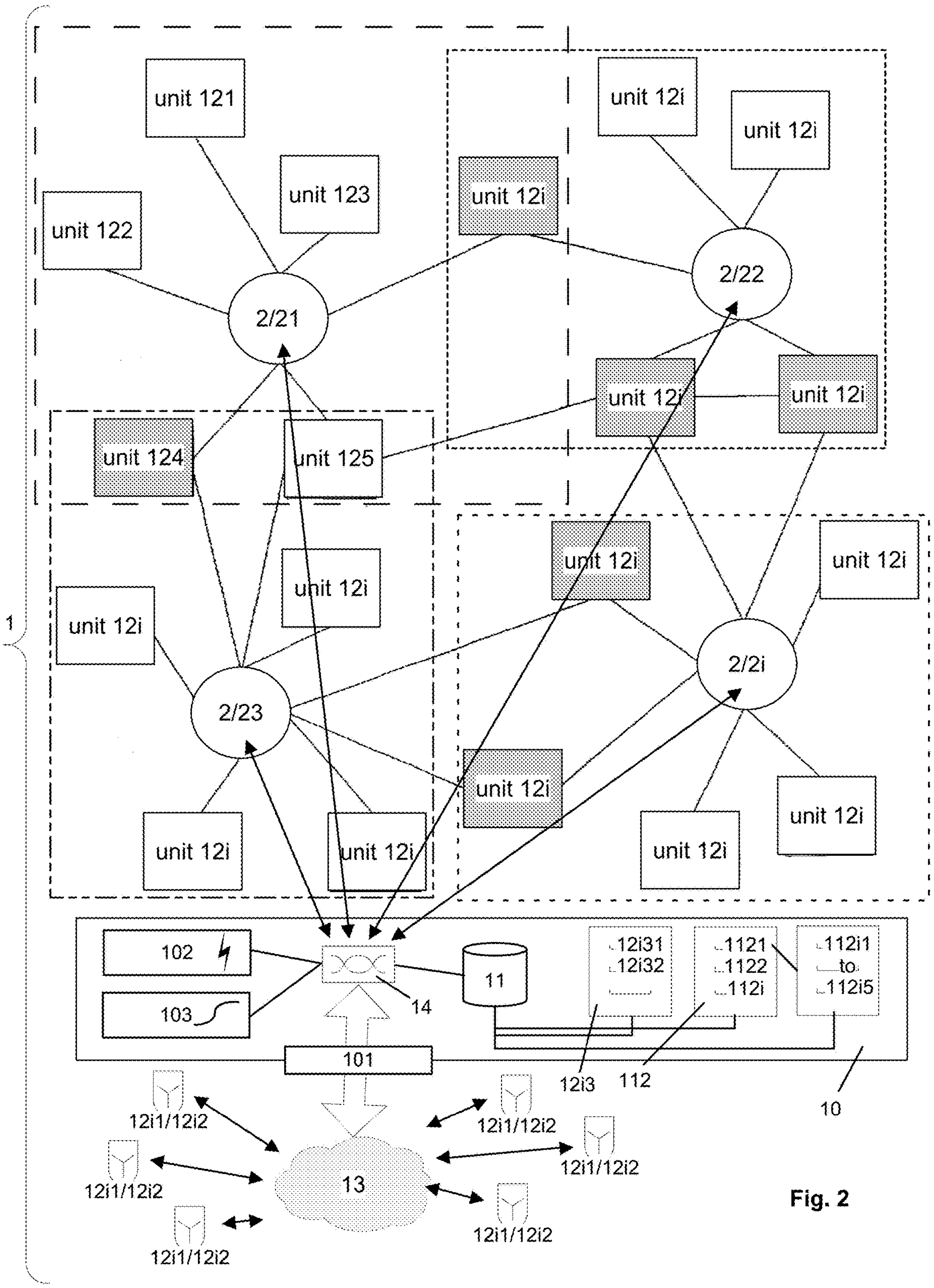
FIG. 2 shows a diagrams illustrating schematically an exemplary open modular cross-data system 1 providing a standardized secured data aggregator by a central digital platform 10 for interlinking sensitive risk-related data, the open modular cross-data platform 1 providing controlled data-driven and/or process-driven cross-data interaction between units 12*i* of the open modular cross-data system 1 and the central digital platform 10, and the units 12*i* having associated heterogeneous data sources 12*i*1 and/or data measuring or capturing devices 12*i*1 and using one or more network-enabled devices 12*i*2 to access the central digital platform 10 by a secure network 14 provided by the open modular cross-data system 1.

RDS is an open digital risk-transfer ecosystem where users, as corporates, can e.g. automatically access, provide and exchange risk data and/or risk-transfer structures and/or processes and services. The digital risk data and services (RDS) platform enables corporates to bring their risk-relevant data together in a single confidential data foundation. Additionally, corporates can gain access to a wide range of data assets and services to better understand and manage the risks they are facing, with the ultimate goal of reducing their total cost of risk. What makes the digital RDS platform unique is that it is an open digital ecosystem platform. Unseen associated service providers of the system, third parties can e.g. be enabled to join the platform on equal terms, creating mutually reinforcing network effects. At the same time, a corporate's data is stored in a private space where they control access and retain full data ownership.

Initial RDS processes and services include: (i) Automated visualizing property portfolios and understanding aggregated exposures, (ii) Automated comparing claims experience against market expectations and optimizing insurance programmes, (iii) Automated leveraging large loss scenarios to better understand tail exposures, (iv) Automated creating a digital twin of production and supplier networks, receiving alerts and simulating scenarios, (v) Automated compiling sustainability metrics and analyzing the impact of climate change, and (vi) Automated capturing and managing risk-relevant data and documents and simplified sharing with risk partners.

The digital RDS system can analyze various risks. Initial RDS processes use cases cover, amongst others, NatCat, Marine Cargo, Business Interruption, Product Liability as well as Accident & Health. The scope is widened by the number of participants joining the digital platform.

The digital RDS platform is modular, so that it can be based at least partially also on third party components as e.g. Palantir technology. The digital RDS platform provides automated risk expertise and data assets underpinning the initial processes and services that are developed in collaboration with clients, leveraging 150 years of experience in the market. At the same time, RDS is able to act as a neutral platform operator, enabling other providers to offer their services at arm's length. The modular contributions can e.g. comprise technology platforms for data-driven analysis and decision-making through integration and transformation of large scale real-world data. Further, the inventive digital RDS platform provides processes, automated services and applications providing security, data storage, distribution process and application delivery functionalities. Some solutions are augmented by additional components, models, or logic. Client data on the RDS system are always be owned by the user and/or corporate, lives in their private space and can be fenced to be accessible by the operator of the digital platform or any other platform participant unless the user choses to share it. Hereby, the user is able to control data access and permissioning on a highly granular level with full transparency on who is able to view and edit which dataset as well as any derived or transformed versions of the data.

The digital RDS platform provides robust security and control for client/user data, while offering a wide range of possibilities to connect to existing systems One of the key capabilities of the RDS platform is its controls around handling sensitive data, e.g. by applying organization-specific security markings or by encrypting all data in transfer and at rest.

Users/clients can manage access of their resources through standardized role profiles or on a granular customizable level, using a RDS security management user interface. RDS enforces multi-factor authorization and can enable Single-Sign-On. Actions by client users on RDS are logged and can be reviewed or audited by the client.

RDS offers an automated subscription and usage-based pricing model structure, that allows a client to automatically select the processes, services and level of support needed, consisting of a base offering and modular add-ons. On the digital RDS platform, data can e.g. be uploaded, and processes/services consumed without requiring a direct connection to a client's IT source system, e.g. through a simple drag and drop of tabled files as Excel files in a web interface. To gain a head start, the inventive system can leverage risk exposure data that has previously been shared as part of a risk transfer relationship.

As FIG. 1 shows, the open modular cross-data system 1 provides a standardized secured data aggregator by a central digital platform 10 interlinking sensitive risk-related data. The open modular cross-data platform 1 provides controlled data-driven and/or process-driven cross-data interaction between units 12*i* of the open modular cross-data system 1 and the central digital platform 10. The units 12*i* have associated heterogeneous data sources 12*i*1 and/or data measuring or capturing devices 12*i*1 and use one or more network-enabled devices 12*i*2 to access the central digital platform 10 by a secure network 14 provided by the open modular cross-data system 1.

Each unit 12*i* has an assigned authentication 12*i*3/12*i*31 and authorization 12*i*3/12*i*32 within the open modular cross-data system 1 providing a controlled network access 14 to the central digital platform 10 and a fenced data space 112/112*i* of a persistence storage 11 of the central digital platform 10 for each of the units 12*i* via the secure network 14.

The central digital platform 10 comprises a network-interface 101 for secure bidirectional data transmission between the central digital platform 10 and a unit 12*i*. All data transmissions and communications between a unit 12*i* and the central digital platform 10 are hosted in the fenced data space 112/112*i* associated with the unit 12*i* uploading and/or assessing data via the network-enabled devices 12*i*2 of the unit 12*i* and the network-interface 101 for data pre-processing 102 and processing 103 by central digital platform 10. The pre-processing of the data can e.g. comprise data enrichment and/or data completion by processing or enhancing the transferred data of a unit 12*i* using by data linked to the preprocessed data or data from additional sources. The additional sources can e.g. comprise anonymized data associated with fenced data spaces 112 of other units 12*i*. The open modular cross-data system 1 and/or the central digital platform 10 can e.g. comprise access control unit 104, wherein access parameter values 1041 for the access to the fenced data space 112 as secure environment of a unit 12*i* can be set by the unit 12*i* of said fenced data space 112 individually and hierarchically defining access level to at least parts of data of the fenced data space 112 for single units 12*i* and/or groups of units 12*i* and/or the central digital platform 10's use as anonymized data.

The data transmissions and communications between a unit 12*i* and the central digital platform 10 hosted in the fenced data space 112 associated with the unit 12*i* can e.g. comprise periodically scheduled data transmission pipelines and/or data streaming transmitting data continuously or periodically generated by different sources. The data captured by the central digital platform 10 from the periodically scheduled data transmission pipelines and/or the data streaming can e.g. be processed by the central digital platform 10 incrementally using stream processing techniques without having access to all of the data generated by various different data sources at high speed. The central digital platform 10 can e.g. comprise a monitoring unit for detecting any concept drift occurring in the data adapting data pre-processing and processing by central digital platform 10 based on any detected changes in properties of a stream or pipeline over time.

The uploaded data are standardized and/or normalized and/or preprocessed by the central digital platform 10 providing uniform access to each of the units 12*i* to its data. The data captured in the fenced data space 112 of a unit 12*i* can e.g. at least comprise partially exposure linked data associated with said unit 12*i*. The central digital platform 10 can e.g. comprise a data processing module providing exposure-based forecasts and/or data-driven expert opinions and/or process optimization by parameter feedback based on the captured data of the data transmission pipelines and/or the data streamings and/or the parameter values of one or more digital twin structures 4. The central digital platform 10 can e.g. be realized based on a Palantir's platform.

The open modular cross-data system 1 and/or the central digital platform 10 can e.g. comprise standardized digital twin structures 4, wherein a standardized digital twin structure 4 is feed by real-time or quasi real-time data captured via the data transmission pipelines and/or the data streamings, and wherein the parameter evolution of the digital twin is in-line with the physical object 3 or process 3 or individual 3 at any given point in time. Each digital twin structure 4 can e.g. comprise a definable threshold value for a capture latency given by the maximum latency time value of the digital twin parameter values and actual real-time parameter values of the physical object 3 or process 3 or individual 3. In particular, the open modular cross-data system 1 can e.g. be based on a digital twin structure of a twinned physical object and/or process and/or individual, comprising: (A) one or more sensors to sense and/or measure measuring values of one or more designated parameters of the twinned physical system; (B) a processor-driven core engine to receive data associated with the one or more sensors and, for at least a selected portion of the twinned physical system, execute at least one of: (i) a monitoring process to monitor a condition of the selected portion of the twinned physical system based at least in part on the sensed values of the one or more designated parameters, and/or (ii) an assessing process to generate and propagate forward-looking measuring values and/or time-series of forward-looking measuring values of the selected portion of the twinned physical system based at least in part on the sensed values of the one or more designated parameters to a definable future time-window; and (C) a data transmission interface coupled to the core engine to transmit information associated with a result generated by the core engine, wherein the one or more sensors are to sense and/or measure measuring values of the one or more designated parameters, and the core engine is to execute at least one of the monitoring and assessing processes, when the twinned physical system time-dependently changes or propagates.

The central digital platform 10 can e.g. comprise an automated digital process 2/21 for automated loss analytics and automated process optimization and/or for providing parameter-based indication of present of future loss trends and/or automated structuring or assembling of optimized risk-transfer structures based on the captured values of the data transmission pipelines and/or the data streamings and/or the parameter values of one or more digital twin structures. The central digital platform 10 can e.g. comprise an automated digital process 2/22 for an automated digital process 2/22 for automated property exposure management and automated visualization of property portfolio and risk exposures based on the captured values of the data transmission pipelines and/or the data streamings and/or the parameter values of one or more digital twin structures. The central digital platform 10 can e.g. comprise an automated digital process 2/23 for employee health risk-transfer structures and/or processes and/or programmes facilitating automated analysis of complex impact of risks on employee health programmes and/or risk-transfer structures based on the captured values of the data transmission pipelines and/or the data streamings and/or the parameter values of one or more digital twin structures. The central digital platform 10 can e.g. comprise an automated digital process 2/24 for automated policy and/or certificate and/or exposure and/or claims management by automated capturing and automated managing of risk-relevant data and documents via the data transmission pipelines and/or the data streamings and/or the parameter values of one or more digital twin structures. The central digital platform 10 can e.g. comprise an automated digital process 2/25 for automated supply chain resilience by automatically generating one or more digital twin structures of production and supplier networks to be covered and/or fenced by risk mitigation based on the captured values of the data transmission pipelines and/or the data streamings and/or the parameter values of one or more digital twin structures. The central digital platform 10 can e.g. comprise an automated digital process 2/26 for automated sustainability solutions and/or automated compiling of sustainability metrics and tracking against NetZero based on the captured values of the data transmission pipelines and/or the data streamings and/or the parameter values of one or more digital twin structures. The inventive technical framework discloses a technical structure reaches beyond the improvement of traditional technical capabilities. Large data sets are used not only as a functional tool or asset of an IT strategy. The invention, inter alia, introduces a three-tier framework that seizes the opportunities presented by the increasing availability of data, technological advances, and the digitization of technical modeling capacities. e.g. introducing the possibility of standardized, interchanable, and tradable digital twin structures within the framework of the system 1. The standardization level achieved by the inventive structure can e.g. also be used to provide automated detection of event correlation, which simplifies also e.g. threat detection process by making sense of the massive amounts of discrete event data, analyzing it as a whole to find the important patterns and incidents that require immediate attention. Although early event correlation focused on the reduction of event volumes e.g. through filtering, or generalizing measured events, it can be preferable to analyze event streams as they occur, performing pattern recognition to find indications of issues, detection failures, and so on.

The system further allows a new level of data enrichment by enhancing collected data with relevant context obtained from additional sources. Data enrichment can e.g. be provided for the system 1 in two ways. First by performing a lookup at the time of collection and appending the contextual information into the standardized data structure or perform a lookup at the time an event is measured by triggering the enrichment process. Event and/or data normalization, as used with the present system 1, is realized as a classification process that categorizes e.g. events according to a defined taxonomy, such as a predefined event expression framework. Data normalization can e.g. at least partially a necessary step in the correlation process of the present inventive system 1, due to the lack of a common format. It is to be noted, that the inventive standardized framework allows to realize cross-source correlation processes which allow to extend correlation across multiple sources (e.g. different users with fenced data spaces) so that common events from disparate environmental or other measurements can be correlated and/or interrelated. This is based on the inventive standardized technical framework, which is not possible by other prior art systems.

Further, the invention provides the technical structure for making measurements and/or measurement-based predictions regarding the operation or status of a real world physical system 3, such as constructions or industrial plants, e.g. comprising electro-mechanical system. However, the present system can be even applied to living objects 3, e.g. human being with health condition with only minor adaptions. The predicted measures may, inter alia, be based on aging process modelling structures. For example, it may be helpful to predict the remaining life of a technical system, such as an aircraft engine or a mill plant, to help plan when the system should be replaced or when a certain risk measure for a possible loss exceeds a certain threshold value. An expected lifetime or risk measure of a system may be estimated by a prediction or forecast process involving the probabilities of failure of the system's individual components, the individual components having their own reliability measures and distributions, or the probability of an impact of an occurring risk event.

Digital models and modelling executables contain a digital representation of dynamic processes affecting the asset or object or elements of the asset/object, thereby providing its development to future timeframes. It can be distinguished between digital knowledge models (representing the current understanding about relationship of things in the real world. They are often described as digital knowledge graphs, digital risk models (hazard models, rating models, pricing and price development models, etc.) and machine learning model modules that can help to detect non-linear patterns in data to extrapolate the ability to predict outcomes. Having involved a plurality of measuring devices and sensors, the present system is able to constantly or periodically monitor and trigger multiple components of a system, real-world asset or living object 3, each having its own micro-characteristics and not just average measures of a plurality of components, e.g. associated with a production run or slot. Moreover, it may be possible to very accurately monitor and continually assess the health of individual technical components of the physical real-world asset 31/32 or parts of the body of the living object 33, predict their error-proneness, vulnerability, health-status or remaining live-time, and consequently assess and forecast health measures, health risk measures and remaining lifetime. Thus, the system provides a significant advance for example for applied prognostics and risk measuring. It further provides the technical basis for discovering and monitor real-world assets and objects 3 in an accurate and efficient manner allowing, inter alia, to precisely trigger risk measures, or in the context of production systems to reduce unplanned, losses, break downs or at least the associated down time for complex systems. The inventive system 1 also allows to achieve a nearly optimal control of a twined physical system if the relevant sensory data can by measures and assessed, if the life of the parts and degradation of the key components can be accurately determined or, in case of living objects 33, if the health status and condition of the relevant organs can be correctly measured. According to the present invention, these forecast measures are provided by a digital twin 4, in particular a digital risk twin, of a twinned physical system 3.

By means of the at least one input device or sensor 2 associated with the twinned physical asset or object 3, structural 431, operational 432 and/or environmental 433 status parameters 43 of the real-world asset or object 3 are measured and transmitted to the digital platform 1. The status parameters 43 are assigned to the digital twin representation 4, wherein the values of the status parameters 43 associated with the digital twin representation 4 are dynamically monitored and adapted based on the transmitted parameters 43, and wherein the digital twin representation 4 comprises data structures 44 representing states 441 of each of the plurality of subsystems 41 of the real-world asset or object 3 holding the parameter values as a time series of a time period.

As already discussed, some embodiments can e.g. be directed to an Internet of Things associate to facilitate implementation of a digital twin of a twinned physical system. For these variants, the IoT associate may include a communication port to communicate with at least one component, the at least one component comprising a sensor 2 or an actuator associated with the twinned physical system 3, and a gateway to exchange information via the IoT. The digital platform 1 and local data storage, coupled to the communication port and gateway, may receive the digital twin 4 from the data store via the IoT. The digital platform 1 may be programmed to, for at least a selected portion or subsystem 34 of the twinned physical system 3, execute the digital twin 4 in connection with the at least one component and operation of the twinned physical system 3.

The structural and/or operational and/or environmental status parameters 43 can e.g. comprise endogen parameters, whose values are determined by the real-world asset or object, and/or exogen parameters, whose values origin from and are determined outside the real-world asset or object and are imposed on the real-world asset or object. The digital platform 1 can e.g. comprise associated exteroceptive sensors or measuring devices for sensing exogen environmental parameters physically impacting the real-world asset or object and proprioceptive sensors or measuring devices for sensing endogen operating or status parameters of the real-world asset or object. The sensors or measuring devices can e.g. comprise interfaces for setting one or more wireless or wired connections between the digital platform 1 and the sensors or measuring devices 2, wherein data links are settable by means of the wireless or wired connections between the digital platform 1 and the sensors or measuring devices 2 associated with the real-world asset or object 3 transmitting the exogen and endogen parameters measured and/or captured by the sensors or measuring devices 2 to the digital platform 1.

By means of the digital platform 1, data structures 44 for the digital twin representation 4 representing future states 441 of each of the plurality of subsystems 41 of the real-world asset or object 3 are generated as value time series over a future time period based on an application of simulations using cumulative damage modelling processing, the cumulative damage modelling generating the effect of the operational and/or environmental asset or object parameters on the twinned real-world asset or object 3 of the future time period. Modelling and appropriate parameter value processing, as understood herein, technically contain a digitized, formalized representation of the known time-related influences and damage mechanisms. Concerning the digital engineering, the cumulative damage modelling can comprise digital knowledge modelling for the knowledge engineering, time-dependent risk modelling and machine learning modelling that are able to detect non-linear patterns in data to extrapolate the ability to predict outcomes, where the digital knowledge models represent and capture the relationship of the objects in the real world, e.g. described as knowledge graphs. Knowledge graphs are structured knowledge in a graphical representation, which can be used for a variety of information processing and management tasks such as: (i) enhanced (semantic) processing such as search, browsing, personalization, recommendation, advertisement, and summarization, 2) improving integration of data, including data of diverse modalities and from diverse sources, 3) empowering ML and NLP techniques, and 4) improve automation and support intelligent human-like behavior and activities that may involve robots. For example, for a micromechanical device, a micromechanics modelling can be used that includes the internal and external effects on the device can be used in a cumulative damage scheme to predict the time-dependent fatigue behavior. Parameters can be used to model the degradation of the device under fatigue loading. A rate equation that describes the changes in efficiency as a function of time cycles can be provided using experimentally determined reduction data. The influence of efficiency parameters on the strength can be assessed using a micromechanics model. The effect of damage probability measures on the device can be provided by solving a boundary value problem associated with the particular damage mode (e.g. transverse matrix cracking). Predictions from such technical modelling can be back-checked and compared with experimental data, e.g. if the predicted fatigue life and failure modes of the device agree very well with the experimental data. The modelling of the present invention (especially machine learning and risk modelling, i.e. modelling of probability measures of future occurring events) leverage time-series data in order to build a view from the past that can be projected towards the future.

All mentioned prediction and modelling modules (especially risk-based and/or machine learning) leverage time-series data in order to build a view from the past that can be projected towards the future. This also applies to establish frequency and severity measures of events that can be used for risk-based purposes. A risk measure or risk-exposure measure is understood herein as the physically measurable probability measure for the occurrence of a predefined event or development. As mentioned, historical measuring data are also fundamentals to establish frequency and severity of events that can be used for risk measures. Historical data can be used in all areas, like general dimensions (e.g. measuring weather, GDPs (Gross Domestic Products), risk events) as well as more risk-transfer related (e.g. measuring economic losses, insured losses). In the above example of the micromechanical device, the historical data can, inter alia, also be weighted by experimental step-stress test data to verify the cumulative exposure/damage modelling structure.

By means of the digital platform 1, the digital twin representation 4 is analyzed providing a measure for a future state or operation of the twinned real-world asset or object 3 based on the generated value time series of values over said future time period, the measure being related to the probability of the occurrence of a predefined event to the real-world asset or object 3. The digital twin 4 of twinned physical system 3 can, according to some embodiments, access the data store, and utilize a probabilistic structure creation unit to automatically create a predictive structure that may be used by digital twin modeling processing to create the predictive risk/occurrence probability measure.

To process the generated effects captured and measured by physical measuring parameters to the operational and/or environmental asset parameters on the twinned real-world asset 3 of the future time period, the cumulative damage modelling by machine learning modules further can comprise the step of detecting first anormal or significant effects within a generated and measured time series of parameters, wherein the detection of anomaly and significant events is triggered by exceeding the measured deviation from a defined threshold value per a single or set of operational and/or environmental asset parameters.

The system detects second anomaly and significant events based on the time series of the defining the status of operation of the digital twin. By means of dynamic time normalization the topological distance between the measured time series of the parameters over a time is determined as a distance matrix. The dynamic time normalization can be realized e.g. based on Dynamic Time Wrapping. A measured time series signal of the event rates can be matched e.g. as spectral or cepstral value tuples with other value tuples of measured time series signal of the event rates. The value tuples can be supplemented, for example, with further measurement parameters such as one or more of the present digital twin parameters and/or environmental parameters discussed above. Using a weighting for the individual parameters of each measured value tuple, a difference measure between any two values of the two signals is established, for example a normalized Euclidean distance or the Mahalanobis distance. The system searches for the most favorable path from the beginning to the end of both signals via the spanned distance matrix of the pairwise distances of all points of both signals. This can be done e.g. dynamic efficient. The actual path, i.e. the wrapping, is generated by backtracking after the first pass of the dynamic time normalization. For the pure determination, i.e. the corresponding template selection, the simple pass without backtracking is sufficient. The backtracking, however, allows an exact mapping of each point of one signal to one or more points of the respective other signal and thus represents the approximate time distortion. It should be added that in the present case, due to algorithmic causes in the extraction of the signal parameters of the value tuples, the optimal path through the signal difference matrix may not necessarily correspond to the actual time distortion.

By means of a statistical data mining unit of the system, the measured and dynamically time-normalized time series are then clustered into disjoint clusters based on the measured distance matrix (cluster analysis), whereby measured time series of a first cluster index a virtual twin operation or status in a norm range and measured time series of a second cluster index a virtual twin operation or status outside the norm range. Clustering, i.e. cluster analyses, can thus be used to assign similarity structures in the measured time series, whereby the groups of similar measured time series found in this way are referred to here as clusters and the group assignment as clustering. The clustering by means of the system is done here by means of data mining, where new cluster areas can also be found by using data mining. The automation of the statistical data mining unit for the clustering of the distance matrix can be realized e.g. based on density based spatial cluster analysis processing with noise, in particular the density based spatial cluster analysis with noise can be realized based on DBScan. DBScan as spatial cluster analysis with noise works density based and is able to detect multiple clusters. Noise points are ignored and returned separately.

As a pre-processing step, e.g. pre-processing, a dimensionality reduction of the time series can be performed. In general, the analysis data described above are composed of a large number of different time series, e.g. with a sampling rate of up to 500 ms or more, if required by the dynamics of the twinned system/asset/living object. Here, each variable can be divided into two types of time series, for example: (1) Time-sliced time series, when the time series can be naturally divided into smaller pieces when a process or dynamic of a twinned system is over (e.g., operational cycles, day time cycles etc.); and (2) Continuous time series: When the time series cannot be split in an obvious way and processing must be done on it (e.g., sliding window, arbitrary splitting, . . . ). In addition, time series can also be univariate or multivariate: (1) Univariate time series: the observed process is composed of only one measurable series of observations (e.g. structural parameters of the twinned object); (2) Multivariate time series: The observed process is composed of two or more measurable series of observations that could be correlated (e.g., structural parameters and condition/state of the twinned object or an element of the twinned object).

The use of time series for processing steps of the system presents a technical challenge, especially if the time series are of different lengths (e.g., operational parameter/environmental measuring parameter time series). In the context of the inventive system, it may therefore be technically advantageous to preprocess these time series into a more directly usable technical format using preprocessing. Using the dimensionality reduction method, a latent space can be derived from a set of time series. This latent space can be realized as a multidimensional space containing features that encode meaningful or technically relevant properties of a high-dimensional data set. Technical applications of this concept can be found in natural language processing (NLP) methods with the creation of a word embedding space derived from text data or, in the present case, a time series embedding space, or in image processing, where a convolutional neural network encodes higher-order features of images (edges, colors . . . ) in its final layers. According to the invention, this can be technically realized by creating a latent space of several time series from replay data and using this latent space as a basis for subsequent tasks such as event detection, classification or regression tasks. In the present case, a latent space can be generated for time series signals with technical approaches such as principal component analysis and dynamic time wrapping, and also with deep learning-based technical approaches similar to those used for computer vision and NLP tasks, such as autoencoders and recurrent neural networks.

Regarding the generation of the time series embedding space, the fundamental technical problem that complicates the technical modeling and other learning problems in the present case is dimensionality. A time series or sequence on which the model structure is to be tested is likely to be different from any time series sequence seen during training. Technically, possible approaches may be based, for example, on n-grams that obtain generalization by concatenating very short overlapping sequences seen in the training set. In the present case, however, the dimensionality problem is combated by learning a distributed representation for words that allows each training set to inform the model about an exponential number of semantically adjacent sentences. The modelling simultaneously learns (1) a distributed representation for each time series along with (2) the likelihood function for time series sequences expressed in terms of these representations. Generalization is achieved by giving a sequence of time series that has never been recognized before a high probability if it consists of time series that are similar (in the sense of a close representation) to time series that form a set that has already been seen. Training such large models (with millions of parameters) within a reasonable time can itself be a technical challenge. As a solution for the present case, neural networks are used, which can be used e.g. for the likelihood function. On two time series sets it could be shown that the approach used here provides significantly better results compared to state-of-the-art n-gram models, and that the proposed approach allows to use longer time series and time series contexts.

In the present case, the ability of multilayer backpropagation networks to learn complex, high-dimensional, nonlinear mappings from large collections of examples makes these neural networks, particularly Convolutional Neural Networks, technical candidates for the time series recognition tasks. However, there are technical problems for application in the present invention: In the technical structures for pattern recognition, typically a manually designed feature extractor collects relevant information from the input and eliminates irrelevant variability. A trainable classifier then categorizes the resulting feature vectors (or strings) into classes. In this scheme, standard, fully connected multilayer networks can be used as classifiers. A potentially more interesting scheme is to eliminate the feature extractor, feed the mesh with "raw" inputs (e.g., normalized images), and rely on backpropagation to turn the first few layers into a suitable feature extractor. While this can be done with an ordinary fully connected feed-forward network with some success for the task of detecting the time series, there are technical issues in the present context. First, time series of measurement parameters can be very large. A fully linked first layer, e.g., with a few hundred hidden units, would therefore already require several 10'000 weights. An overfitting problem occurs if not enough training data is available. Also the technical requirements for the storage medium grow enormously with such numbers. However, the technical skin problem is that these networks have no inherent invariance with respect to local biases in the input time series. That is, the pre-processing discussed above with the appropriate normalization or other time normalization must normalize and center the time series. Technically, on the other hand, no such pre-processing is perfect.

Second, a technical problem of fully linked networks is that the topology of the input time series is completely ignored. The input time series can be applied to the network in any order without affecting the training. However, in the present case, the processing process has a strong local 2D structure, and the time series of measurement parameters have a strong 1D structure, i.e., measurement parameters which are temporally adjacent are highly correlated. Local correlations are the reason that extracting and combining local features of the time series before recognizing the spatial or temporal objects is proposed in the context of the invention. Convolutional neural networks thereby enforce the extraction of local features by restricting the receptive field of hidden units to local units. In the present case, the use of Convolutional Networks technically ensures in the recognition of the time series that displacement and depletion invariance is achieved, namely through the application of local receptive fields, joint weights (or weight replications), and temporal subsampling of the time series. The input layer of the networks thereby receives time series that are approximately time-normalized and centered (see Time Wrapping above).

For generating the latent space for the time series signals, as described above, e.g. principal component analysis and dynamic time wrapping or deep learning based technical approaches can be chosen, such as the use of recurrent neural networks. However, in the present invention, it should be noted that learning information over longer time intervals using recurrent backpropagation can take a very long time, usually due to insufficient decaying error feedback. Therefore, in the context of the invention, the use of a new, efficient and gradient-based method. Here, the gradient is truncated where it does no harm so that the network can learn to bridge minimal time delays of more than 1000 discrete time steps by enforcing a constant error flow through constant rotations of the errors within a specific unit. Multiplicative gate units thereby learn to open and close access to the constant error flow. By this embodiment according to the invention, the network remains local in space and time with respect to learning the time series.

With respect to an autoencoder embodiment, the network is trained in an unsupervised manner (unsupervised learning) so that the input signal can first be converted to low-dimensional latent space and reconstructed by the decoder with minimal information loss. The method can be used to convert high-dimensional time series into low-dimensional ones by training a multi-layer neural network with a small central layer to reconstruct the high-dimensional input vectors. Gradient descent can be used to fine-tune the weights in such "autoencoder" networks. However, this only works well if the initial weights are close to a suitable solution. In learning the time series, the embodiment described here provides an effective way of initializing the weights that allows the autoencoder network to learn low-dimensional codes that perform better than principal component analysis as a tool for reducing the dimensionality of data. Dimensionality reduction of time series according to the invention facilitates classification, visualization, communication, and storage of high-dimensional time series. One possible method is principal component analysis (PCA), which finds the directions of greatest variance in the time series and represents each data point by its coordinates along each of these directions. For example, as an embodiment variant, a nonlinear generalization of PCA can be used by using an adaptive multilayer "encoder" network to transform high-dimensional time series into low-dimensional codes, and a similar decoder network to recover the time series from the codes. In the embodiment, starting from random weights in the two networks, they can be trained together by minimizing the discrepancy between the original time series and their reconstruction. The system obtains the required gradients by applying a chain rule to propagate the error derivatives back first through the decoder network and then through the encoder network. This system is referred to here as an autoencoder.

The above-discussed unsupervised machine learning procedure for dynamic time-wrapping based (DTW) time series detection, can also be done supervised. Two execution variants of learning strategies, supervised and unsupervised, can be applied with the DTW for the time series according to the invention. For example, two supervised learning methods, incremental learning and learning with priority denial, can be distinguished as execution variants. The incremental learning procedure is conceptually simple, but typically requires a large set of time series for matching. The learning procedure with priority denial can effectively reduce the matching time, while typically slightly decreasing the recognition accuracy. For the execution variant of unsupervised learning, in addition to the variant discussed above, an automatic learning approach based on most-matching learning and based on learning with priority and rejection can also be used, for example. The most-matching learning revealed here can be used to intelligently select the appropriate time series for system learning. The effectiveness and efficiency of all three machine learning approaches for DTW just proposed can be demonstrated using appropriate time series detection test.

In case of detecting first and/or second anomaly and significant events associated with a digital twin respectively with the twinned object/asset, the measured event dynamics or statuses are transmitted as a function of time as input data patterns to a machine-learning unit and the measuring parameters of the digital twin are adjusted by means of the electronic system control based on the output values of the machine-learning unit, wherein the machine-learning unit classifies the input patterns on the basis of learned patterns and generates corresponding metering parameters. By additionally measuring structural/operational parameters comprising measurement parameters for detecting physical properties of the twinned asset/object by means of measuring devices, and/or asset/object parameters by means of proprioceptive sensors or measuring devices, and/or environmental parameters by means of exteroceptive sensors or measuring devices at least comprising air humidity and/or air pressure and/or ambient temperature and/or local temperature distributions, e.g., the machine-learning unit can be adapted to the input patterns on the basis of the measured time series data. e.g., in addition to the measured time series of dynamics/statuses, one or more of the asset/object operational parameters and/or the structural parameters and/or the environmental parameters can be transmitted as a function of time to the machine-learning unit as an input data pattern. The machine-learning unit may be implemented, for example, based on static or adaptive fuzzy logic systems and/or supervised or unsupervised neural networks and/or fuzzy neural networks and/or genetic algorithm-based systems. The machine-learning unit may comprise, for example, Naive Bayes classifiers as a machine-learning structure. The machine-learning unit may be implemented, for example, based on supervised learning structures comprising Logistic Regression and/or Decision Trees and/or Support Vector Machine (SVM) and/or Linear Regression as machine-learning structure. For example, the machine-learning unit may be realized based on unsupervised learning structures comprising K-means clustering or K-nearest neighbor and/or dimensionality reduction and/or association rule learning. The machine-learning unit may be realized, for example, based on reinforcement learning structures comprising Q-earning. For example, the machine-learning unit may be implemented based on ensemble learning comprising bagging (bootstrap aggregating) and/or boosting and/or random forest and/or stacking. Finally, the machine-learning unit can be realized based on neural network structures comprising feedforward networks and/or Hopfield networks and/or convolutional neural networks or deep convolutional neural networks.

As used herein, the term "automatically" may refer to, for example, actions that can be performed with little or no human intervention. As further used herein, devices, including those associated with the digital platform 1 may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network a wireless LAN network, and/or an Internet Protocol ("IP") network such as the Internet, an intranet, or an extranet. Note that any devices described herein may communicate via one or more such communication networks. The digital risk twin 4 of the twinned physical system 3 can e.g. store information into and/or retrieve information from various data sources, such as the sensors 2, the data store etc. The various data sources may be locally stored or reside remote from the digital twin 4 of the twinned physical system 3.

By means of the digital platform 1, the control of an operation or status of the real world asset or object 3 can be optimized or adjusted to predefined operational and/or status asset or object parameters of the specific real-world asset or object 3 based on the provided measure for a future state or operation of the twinned real-world asset or object 3 and/or based on the generated value time series of values over said future time period. In case of an optimized control of operation, the optimized control of operation is generated to jointly and severally increase the specific operating performance criteria in time and future of the real-world asset or object or decrease a measure for an occurrence probability associated with the operation or status of the real-world asset or object within a specified probability range. The decrease of the measure for an occurrence probability associated with the operation or status of the real-world asset or object 3 can e.g. be based on a transfer of risk to an automated risk-transfer system controlled by the digital platform, wherein values of parameters characterizing the transfer of risk are optimized based on said measure for a future state or operation of the twinned real-world asset or object 3 and/or based on the generated value time series of values over said future time period. In order to optimize the status of the real-world asset or object 3 or the probability of an occurrence of a predefined risk event, an optimizing adjustment of at least a subsystem 34 of the real-world asset of object 3 can e.g. be triggered by means of the digital platform 1. The triggering by means of the digital platform 1 can e.g. be performed by electronic signal transfer.

As variant, the digital twin 4 of the twinned physical system 3, i.e. the digital virtual replicas are constantly updated and analyzed by measuring data from their real counterparts, i.e. the twinned physical system or object 3 and from the physical environment that surrounds them in their real physical world. The digital platform 1 is able to react on the digital twin 4 and it can run analysis related to historical data, current data and forecasts. It is able to predict what will happen in each case and the associated risk, and thus be able automatically propose actions and provide appropriate signaling. Even the virtual twin itself or the digital platform 1, respectively, can act, when technically realized as such, on the technical means of its real-world twin 3, given that the two are linked by appropriate technical means. For example, by electronically sensing and triggering the occurrence of one or more specified threshold values emerging from or otherwise popping up at the digital twin 4 by means of a trigger or control module of the digital platform 1, electronic signaling can be generated by means of a signaling module and a data-transmission interface of digital platform 1, which is transmitted over a data-transmission network to the corresponding technical means or a PLC (Programmable Logic Controller) steering the corresponding technical means of the digital twin 4. In this case, the digital platform 1 is connected via the data-transmission network, which can include a land-based and/or air-based wired or wireless network; e.g., the Internet, a GSM network (Global System for Mobile Communication), an UMTS network (Universal Mobile Telecommunications System) and/or a WLAN (Wireless Local Region Network), and/or dedicated point-to-point communication lines. As the measuring sensors at the real-world asset or object 3, the corresponding technical means can be connected to the digital platform by telematics devices, allowing a continuous monitoring and control of the real-world twin 3. The corresponding technical means of the real-world twin 3 can e.g. comprise switches (e.g. on/off switches) activating or deactivating the associated technical means or the operation of the real-world asset or object 3 to prevent damage or loss at the real-world asset or object 3. In case of a living real-world object 3, the corresponding technical means can e.g. comprise electronic alarm means signaling an imminent occurrence of a damage or loss event to the living object 3 or emergency systems, as e.g. a heart attack or stroke. The PLCs, as mentioned above, are enabled to electronically control and steer appropriate technical means of the real-world asset or object 3 and can range from small modular devices with tens of inputs and outputs (I/O), in a housing integral with the processor, to large rack-mounted modular devices with a count of thousands of I/O, and which are often networked to other PLC and SCADA (Supervisory Control And Data Acquisition) systems. The PLCs can be designed for multiple arrangements of digital and analog I/O, extended temperature ranges, immunity to electrical noise, and resistance to vibration and impact. Executable program codes to control a possible machine operation at the real-world asset 3 can e.g. be stored in battery-backed-up or non-volatile memory.

The present invention has inter alia the advantage, that the digital platform 1 is consolidated in Industry 4.0 technology, especially providing new technical advantages in the automation of risk-transfer and insurance technology, in particular automated risk control and management systems. For example in the case of automated means for risk-transfer in the context of associated vehicles or houses, their nowadays increasing hyper-connection will contribute to the construction of the digital twins 4 by means the digital platform 1, so that the platform 1 provides new technical ways to generate predictive modelling and offer automated personalized services. Especially, if the subject of the risk-transfer is not a real-world asset 3 but a living object 3, that brings a degree of complexity, where trying to forecast and predict human factors will always involve a considerable margin of error, and the inventive digital platform 1 is able to solve by means of the digital risk twins challenge in the risk-transfer technology, where prior art systems are not able to cope with. As an increasing amount of personal data are generated e.g. through smartphones, fit-bits or other devices e.g. in smart homes, for example, prior art systems are, despite the availability of more and more data, not able to make them coherent and to translate them into probable behavior (and its associated risk measures). Thus, the inventive system 1 is able to play a key role that allows a more direct and personalized relationship with the living object 3 (i.e. the risk-transfer client) and is able to provide a critical technical role as new intermediary between data providers and risk-transfer systems, specialized in interpreting the accumulating big data of risk-transfer customers by linking it to the generation of appropriate digital twins 4.

As an embodiment variant, based on the measure for a future state or operation of the twinned real-world asset or object, a forecasted measure of an occurrence probability of one or more predefined risk events impacting the real-world asset or object 3 can e.g. be generated by propagating the parameters of the digital twin representation 4 in controlled time series. As a further embodiment variant, the digital platform can e.g. comprise and trigger an automated expert system of the digital platform 1 by means of electronic signal transfer, wherein the digital platform 1 triggers the transmission of a digital recommendation to a user interface generated by the expert system of the digital platform based on the measured value of the measure for a future state or operation of the twinned real-world asset or object and/or the measured probability of the occurrence of a predefined physical event to the real-world asset or object 3, The digital recommendation comprises indications for an optimization of the real-world asset or object 3 or adaption of the structural, operational and/or environmental status parameters.

Figure 3:
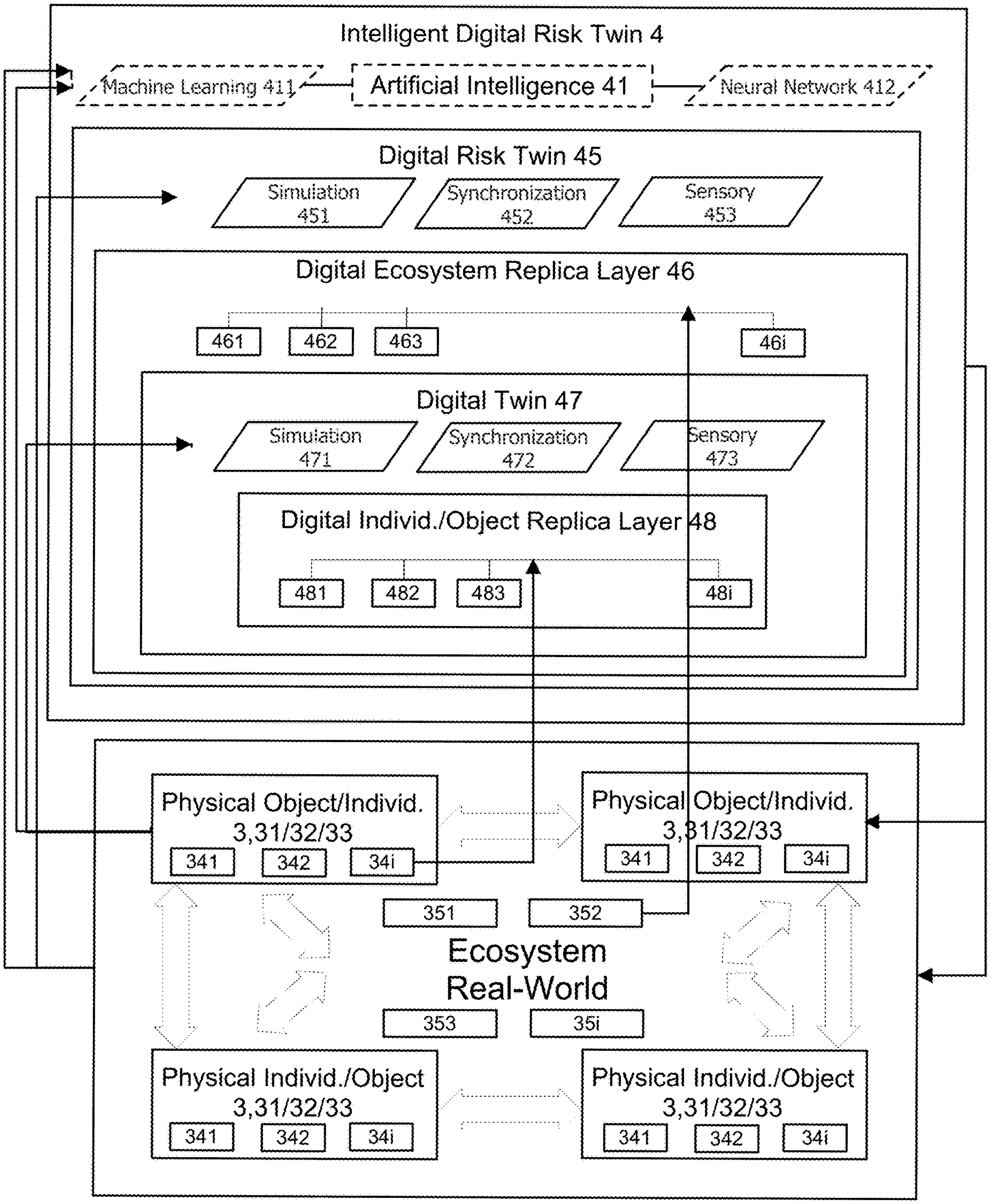
FIGS. 3 and 4 show block diagrams illustrating schematically an exemplary digital risk twin, which can be made available throughout the entire lifecycle of the real-world individual 31/32 or object 33 and/or digital platform 1 through its structure, as shown in FIGS. 3 and 4.
Figure 4:
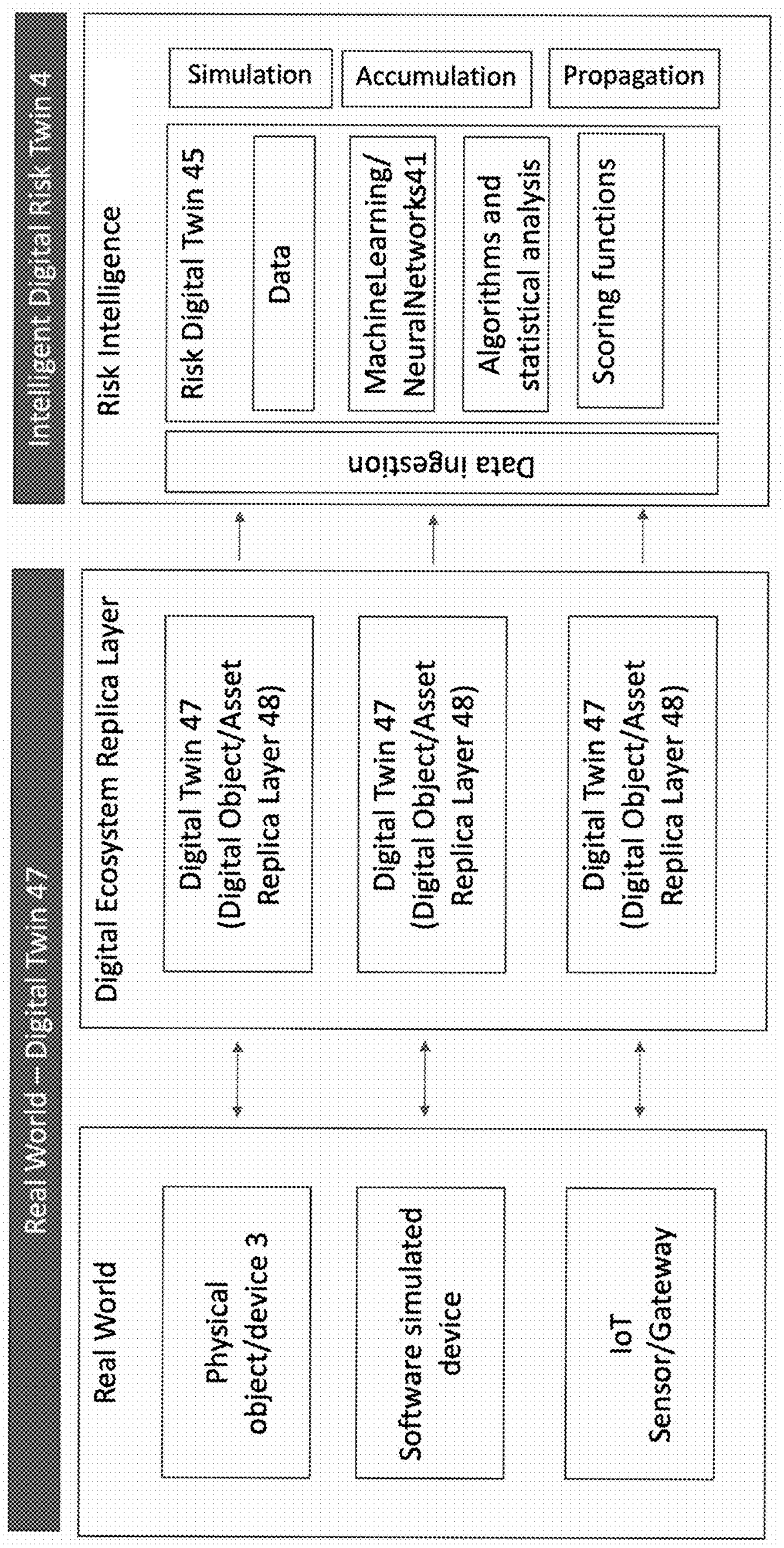
Figure 5:
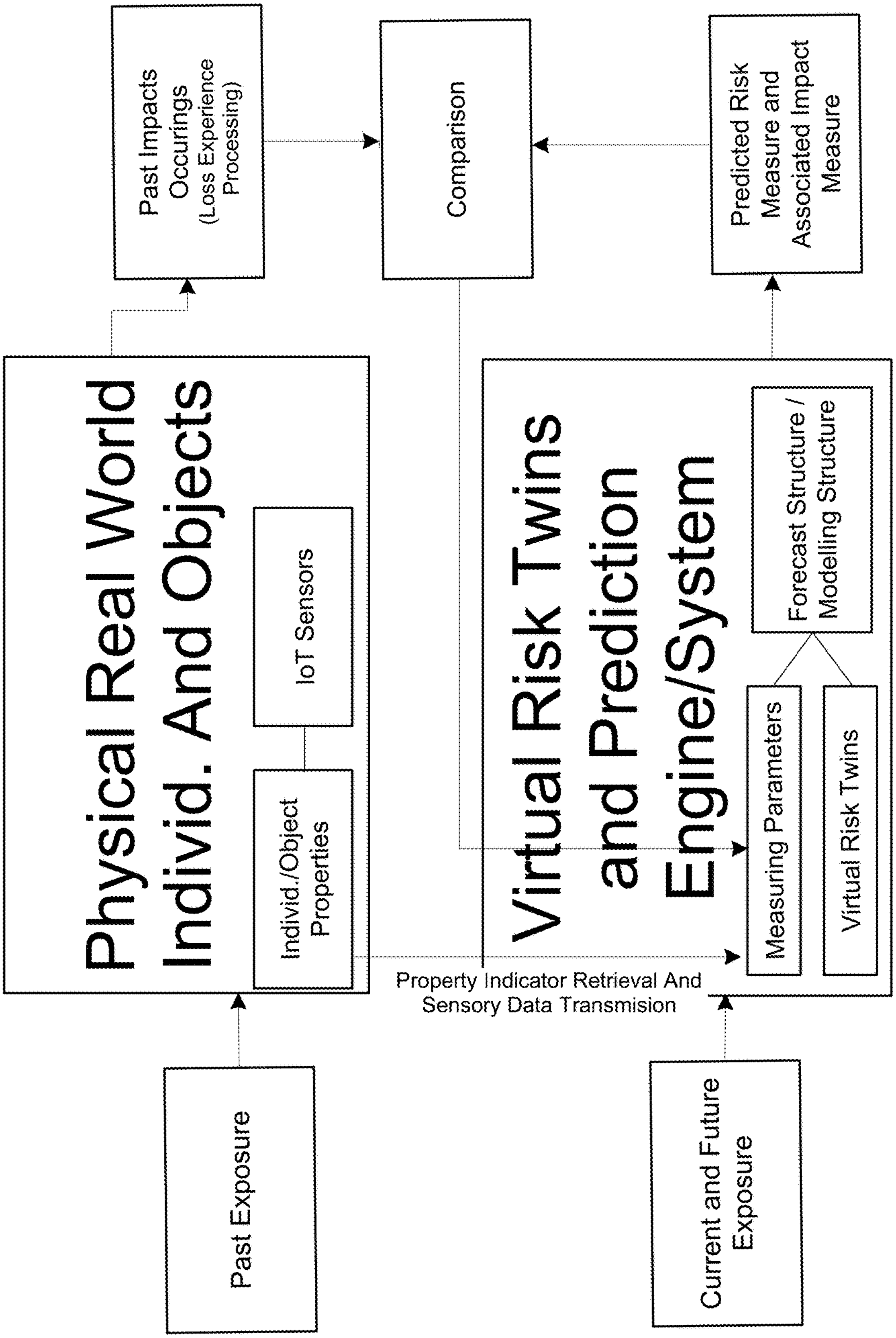
FIGS. 5 and 6 show block diagrams, schematically illustrating the basic structure comprising three main parts: the predicting digital risk twin structure, the properties indicator retrieval and the impact experience processing. The virtual risk twin structure allows to forecast quantitative risk measures and expected impact/loss measures from the digital risk twins using characteristic technical main elements, namely the digital risk twin structure with the simulation and synchronization means and the IoT sensory providing the constant real-world streaming linkage and connection (c.f.
Figure 6:
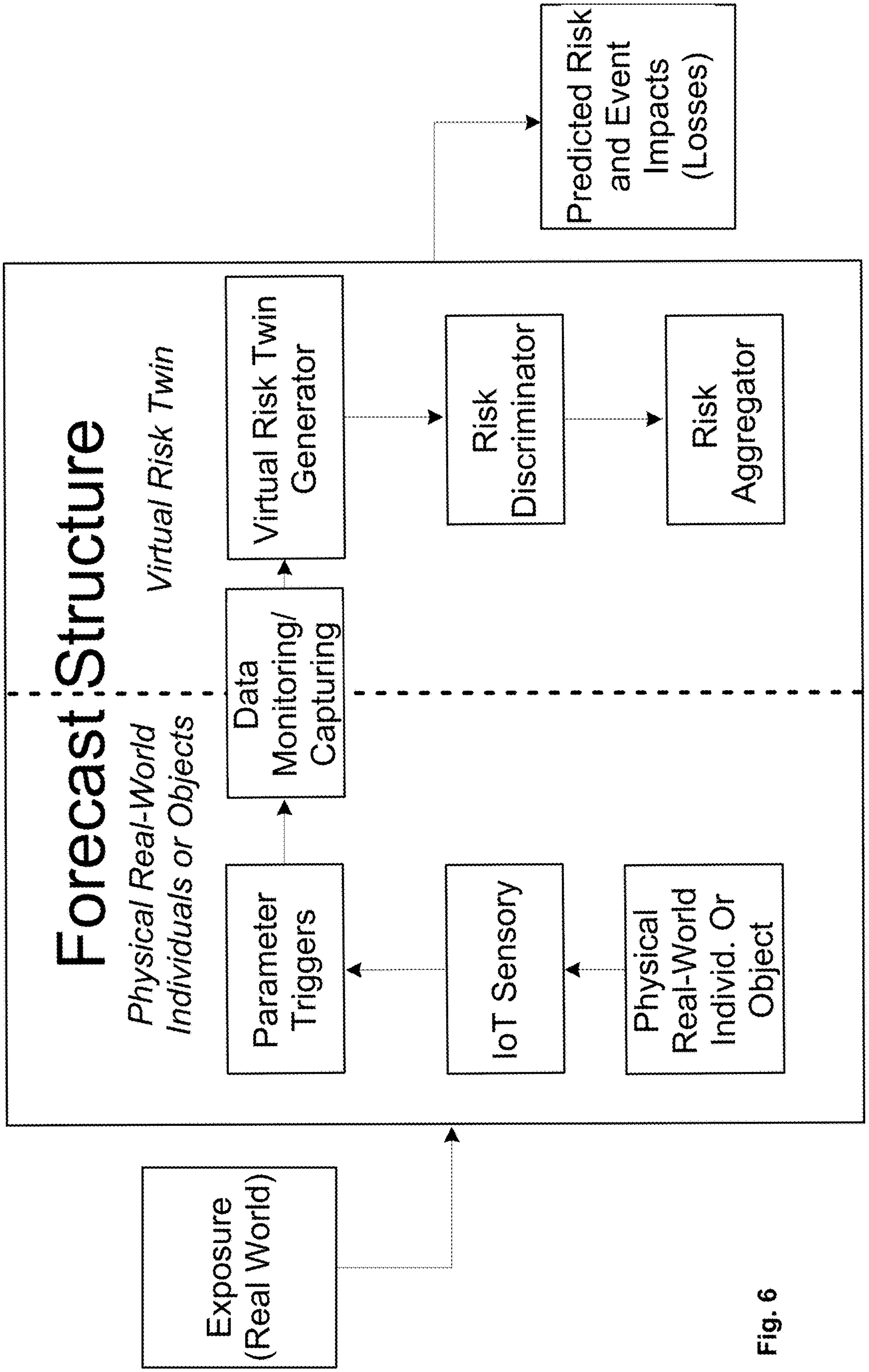
Figure 7:
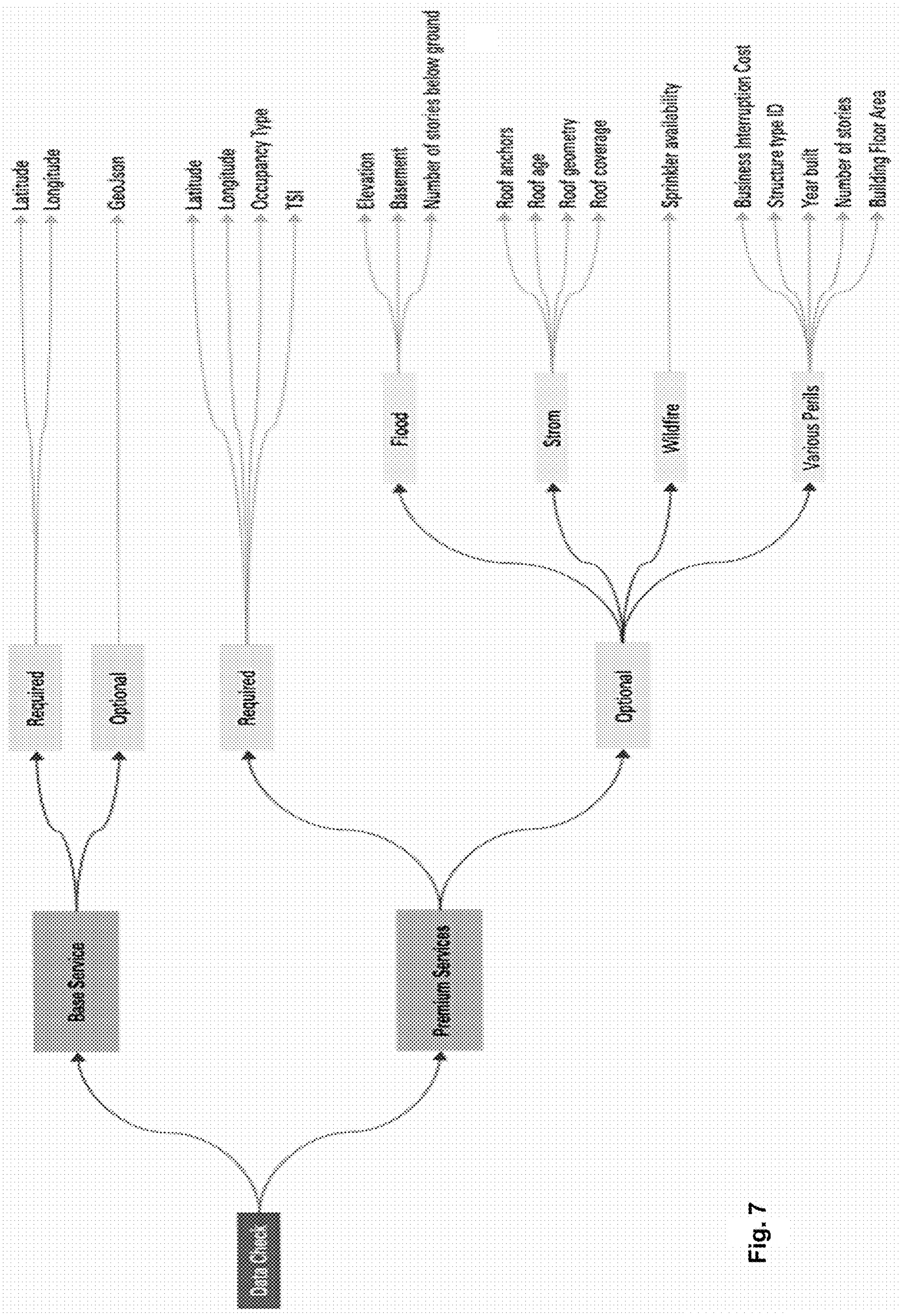
FIG. 7 shows a block diagram illustrating schematically an exemplary process during data enrichment and completion based on a dedicated cascade of trigger data in a processed data completeness check.

FIGS. 3 and 4 show a more detailed schematic representation of the standardized digital risk twin structure 4, in particular the digital asset/object replica 48, the digital twin 47, the digital ecosystem replica 46, the digital risk robot 46 and the digital twin 4 with its optional artificial intelligence 45 of a physical entity 3 in the inventive digital platform 1. In the digital platform 1 and digital risk twin 4, respectively, each physical asset/object 3 consists of its digital modelling structures 481, 482, 483, . . . , **48*i* and associated data and its digital modelling structures 461, 462, 463, . . . , 46*i* and associated data. The digital twin 47 with the digital asset/object replica 48 is realized as a continuously updated, digital structure hold by the digital platform 1 that contains a comprehensive physical and functional description of a component or system throughout the life cycle. As such, the digital risk twin 4 provides a realistic equivalent digital representation of a physical asset or object 3, i.e. a technical avatar, which is always in synch with it. It allows to run a simulation on the digital representation to analyze the behavior of the physical asset. Additionally, each digital risk twin 4 of the digital platform 1 can comprise a unique ID to identify a digital risk twin 4, a version management system to keep track of changes made on the digital risk twin 4 during its life cycle, as already describe above, interfaces between the digital risk twins 4 for co-simulation and inter-twin data exchange, interfaces within the digital platform, in which the digital risk twins 4 are executed an/or held, and interface to other digital risk twin for co-simulation. Further aspects of a digital risk twin 4 relate to the internal structure and content, possible APIs and usage, integration, and runtime environment. The aspect of APIs and usage relate to the possible requirements for interfaces of the digital risk twin 4, in particular such as cloud-to-device communication or access authorization to information of the digital risk twin 4. For such integration the system 1 comprises an identification mechanism for unambiguous identification of the real asset/object 3, a mechanisms for identifying new real assets/objects 3, linking them to their digital risk twin 4, and synchronizing the digital risk twin 4 respectively its twinned subsystems with the real asset/object 3, and finally technical means for combining several digital risk twin subsystems into a digital risk twin 4. The ID provides the technical identification of a unique digital risk twin 4 with a real-world asset/object. With the help of this unique ID, the data and modelling structures of the digital risk twin 4 are stored as a module on a database containing all data and information and can be called any time during engineering or reconfiguration. This obviously supports modularity in the context of modular system engineering. A digital risk twin 4 provides the means to encapsulate the subsystems of a real-world asset/object 4. For example, CAD models, electrical schematic models, software models, functional models as well as simulation models etc. Each of these models can e.g. be created by specific means during the engineering process of a digital risk twin 4. An important feature are the interfaces between these means and their models. Tool interfaces can be used to provide interaction between modelling structures. For example, the modelling structures can be updated or reversioned during the entire life cycle or domain-specifically simulated with the aid of different inputs. The digital risk twin 4 of a real-world asset/object 3 should not only contain current modelling structures, but also all generated modelling structures during the entire lifecycle. This, for example, can support efficient engineering during reconfiguration and expandability throughout the lifecycle. Digital risk twin 4 time-series management provides access to all stored versions of the modelling structures and their relations. This allows the old version to be called up any time at the request of an engineer, taking into account the circumstances during engineering or reconfiguration, and to switch to the current version. As describe above, in order to accurately reflect the behavior and current state of the real-world asset/object 3, the digital risk twin 4 must contain current operation data of the asset/object 3. This can be sensor data, which are continuously streamed and recorded, as well as control data, which determines the current status of the real component, also recorded over the entire lifecycle. Finally, as a variant, a co-simulation interface for communication with other digital risk twins 4 can be provided to obtain more precise image of reality. For example, a data exchange can enable multidisciplinary co-simulation in the digital platform 1. This can be used to simulate the process flow of the entire system 1** in the real world.

As discussed above, the digital risk twin 4 can comprise an artificial intelligence layer 41. Such an intelligent digital risk twin 4 rises the system 1 to a complete autonomous level compared to the digital risk robot 45 in the digital platform 1. This allows the digital platform 1 and the digital risk twin 4 to cope with the streaming data amount coming from the measuring devices of the real-world asset/object 3, which can comprise, for example telematic devices of smart homes or smart cities or cars, in particular autonomous car system, in case of a real-world asset 31/32, or in case of a living object, as a human, wearable devices measuring body-related parameters. It is to be noted, that the digital platform 1 may comprise different digital risk twins related to different aspects of a user's life, as e.g. an IoT-based smart-home digital risk twin 4, a telematic-based vehicle digital risk twin 4, and/or a telematic-based body risk twin 4, enabling the system 1 to measure and trigger extended and/or combined risk exposure measures of a certain user. In the context of smart-homes, smart-cities, interconnected cars and the like, interoperability can be achieved either by adopting universal standards for a communication protocol or by using a specialized device in the network that acts like an interpreter among the different measuring and sensory devices and protocols. The interoperability in the context of IoT-based and/or telematics and/or smart wearable devices and big data solutions can so be achieved.

An intelligent digital risk twin 4, using the entire system's actual digital risk twin 45, can be used to realize processes such as optimization of the process flow, automatic control code generation for newly added real-world devices/assets/objects 3 in the context of plug and produce and predictive maintenance using stored operation data in the digital risk twin 4 throughout the lifecycle. To realize this, additional components are required to equip the digital risk twin 4 architecture with intelligence. As shown in FIG. 3, for such additional components, being the digital replica layers 46/48 modelling comprehension, intelligent digital risk twin algorithms 41 and e.g. extra interfaces for communicating with the physical asset/object 3 are added to the architecture of the digital risk twin 4 to make it self-adaptive and intelligent.

To dynamically synchronize the digital risk twin 4 with the physical asset/object throughout the entire lifecycle of the twin 4, the digital platform 1 and the digital risk twin 4, respectively, comprise the technical means to understand and manage all modelling structures and data. Accordingly, the digital risk twin 4 modelling comprehension in the structure of FIG. 3 fulfills this purpose by storing information of the interdisciplinary modelling structures 46/48 within the digital risk twin 4 and its relations to other digital risk twins 4. The digital risk twin 4 modelling structure is realized with a standardized semantic description of modelling structures, data and processes for a uniform understanding within the digital risk twin 4 and between digital risk twins 4. Technologies to implement such a standardization can, for example, be OPC UA (OPC: Open Platform Communications, UA: Unified Architecture) or OWL (Web Ontology Language of the World Wide Web Consortiums (W3C)).

The autonomous, intelligent digital risk twin 4 comprises two important capabilities regarding the processing of acquired operation data. It applies appropriate algorithms on the data to conduct data analysis. The algorithms extract new knowledge from the data which can be used to refine the modelling structure of the digital risk twin 4 e.g., behavior modelling structures. Thus, the intelligent digital risk twin 4, as embodiment variant, can provide electronic assistance and appropriate signaling e.g. to a worker at a plant to optimize the production in various concerns. Further, a digital risk twin 4 incrementally improves its behavior and features and thus steadily optimize its behavior, as e.g. the mentioned signaling to the worker of the plant. Therefore, dependent on the type of the twinned real-world asset/object 3, the digital risk twin 4 can provide autonomous steering signaling and electronic assistance signaling for different use cases such as process flow, energy consumption, etc.

Concerning co-simulation of different digital risk twins 4, in case of industrial assets 31, an optimized combination and process chain between digital risk twins 4 can e.g. be realized by parameterizing the existing modelling structures in relation to other digital risk twins 4 in a co-simulation environment. Based on the results of this simulative environment, the intelligent digital risk twin 4 triggers a parametrization of physical assets 31. In another example, the time-dependent evolving structure of a digital risk twin 4 is e.g. used to optimize individual parameters of the real-world asset or object 3, i.e. to determine optimal real-world asset's or object's 3 parameters. For example, as a consequence, the amount of degraded products can be minimized leading to an increased quality of a concerned manufacturing process, as e.g. a milling process.

According to another embodiment variant, other artificial intelligence algorithms 41 deal with automated code generation, for example through service-oriented architecture approaches for real machines based on the new requirements. This allows approaches such as plug and process to be realized. Other intelligent algorithms 45 can e.g. provide a simulation-based diagnostic and prediction processing through data analysis and knowledge acquisition, for example in the context of desired predictive maintenance. Such machine-based intelligence 45 can e.g. comprise algorithms to product failure analysis and prediction, algorithms to optimization and update of process flow, algorithms for generating a new control program for the twinned real-world asset 31 based on new requests, algorithms for energy consumption analysis and forecast etc. As an embodiment example of autonomous analysis of a digital risk twin 4, an example for a production plant as real-world asset 31 is provided in the context of historical process data of such production plants to predict future maintenance intervals or to maximize the availability of the plant (i.e. predictive maintenance signaling). To extract a model from or find correlations within operation data, unsupervised learning techniques such as k-means clustering or auto encoder networks with LSTM cells can be applied on time series data. In case of k-means clustering with sliding windows, the learned time-sensitive cluster structure is used as model for the system behavior. This circumstance allows for instance the detection of anomalies and the prediction of failures. To do so, a distance metric that considers the current point in time is applied on a test data set of currently acquired data and the cluster centers of the trained model.

Anomalies in the test data set are detected by defined time-dependent limit violations to the cluster centers as well as the emergence of new, previously non-existent clusters. Thus, the slinking emergence of failure can be predicted based on the frequency of anomaly occurrences and their intensity of deviation.

As a further embodiment example, the digital risk twin 4 can e.g. be applied to automated risk-transfer and risk exposure measuring systems. Also in this example, the digital representation of the risks related to a specific real world asset or object 3. The digital platform allows the generation of signaling giving a quantification measure of risks, e.g. with appropriate numbers and graphs. The digital platform 1 thus comprises automated risk assessment and measuring and risk scoring capabilities based on the measured risks, i.e. probability measures for the occurrence of a predefined risk event with an associated loss. The digital platform 1 is able to measure the risk impact on a much larger scale (i.e. engine>plant>supply chain) by means of the digital risk twin 4. The digital risk twin 4 has further the advantage that it can be completely digitally created/managed. It allows to extend the risk-transfer technology for risk based data services and provides an easy access to asset/object 3 related insights/analytics by means of the digital risk twin 4. Further, it allows to provide normalization of risk factors and values, as described above, and is easy to integrate in other processes/value chains.

The twinned real world entity can be a physical or intangible asset 31/32 or a living object 33, e.g. a human being 331 or an animal 332. The complete digital platform 1 can be used on digital twins (IoT) and appropriate data feeds. The digital platform 1 can e.g. be realized in the sense of a risk intelligence factory creating the digital risk twin 4 by applying a company's intelligence (risk, actuarial, Machine Learning, etc.) to data assets. In contrast to the digital twin 47, which uses data from IoT sensors, physical modelling structures of the real-world device/asset/object 3 providing time-dependent measures for the performance and/or status etc., the digital risk twin 45 captures and measures data from multiple sources comprising ecosystem measuring parameters and involves a risk modelling structure of the real-world asset/object 3 and the environment, which allow to effectively measure and trigger risk-related factors, as e.g. exposure measures or occurrence probabilities of risk-events or impact measures under the occurrence of a certain event with a certain strength or physical characteristic. Thus, it allows inter alia to effectively optimize and minimize risk impacts, respectively.

The recording of the analysis-measurement data, i.e. the stream of measuring parameters measured by the sensors and/or measuring devices associated with the twinned object/asset allows the realization of the replay function according to the invention (therefore the designation of the analysis-measurement data also as replay data; cf. above). The replay function is intended as a specific embodiment of the system according to the invention. It can be realized with and without the above discussed optimization function, i.e. with and without adjusting the digital twin parameters or with or without adjusting operational/structural/environmental parameters of the twinned object/asset by means of the electronic signaling system control based on the output values of the machine-learning unit. In principle, the recording of the analysis-measurement data can be triggered by the detection of a first and/or second event (e.g. detected by its anomaly or significance) of the time series. Such a replay embodiment with provision of analysis measurement data (as replay data) can e.g. monitor a time period in the replay mode of the digital twin and/or twinned object/asset. The analysis measurement data are recorded, for example, on a storage medium of a server (S). By means of an assembly (BG) comprising a client for time-shifted retrieval of analysis measurement data, a time-shifted to real-time section of the replay data is selected, e.g., by means of a time tag (time-based tagging) or an event area displayed by the system to the user for selection, and requested, e.g., by means of a request from server S. The server S provides the requested time section to the user. The latter compiles the requested time section of the replay data in the form of multimedia data packets and transmits them over the network to the client of the assembly. The client unpacks the multimedia data packets and displays them for the user on the monitor (M). The assembly with the client can be part of the server S, e.g. implemented as part of the system control, or as a network assembly which can access the server S or the system control with integrated server S via the network N. A time data set diagram highlighting a time range available for retrieval can e.g. be displayed to the user of system 1 e.g. including an event detected by the system 1. The entire real time analysis data stream can be recorded or only time ranges of the analysis data stream, i.e. the replay data, in which first and/or second events were detected by the system 1. An embodiment variant according to the invention can also be implemented in such a way that the user can jump to any point in time in the past of the recorded analysis data stream, i.e. independently of event detections. Also, the user can, e.g., time-delayed beyond a certain time range, retrieve the analysis measurement data from the stored replay data stream, jump forward (forward) or backward (rewind) one time range in the recorded data stream at a time x. Finally, the detected event time ranges can e.g. be displayed to the user for selection, e.g., via the client on the board. In particular, a further embodiment can be realized in such a way that the connected twinned object/asset respectively the digital twin, can be set again by the electronic system controller to the exact operating mode or status with the same measuring parameters as in the detected event area. The digital twin and/or the connected twinned asset/object can thus be run through the event area again in real time, e.g. for testing, optimization or other verification purposes.

As discussed above, e.g. the whole real-time analysis data stream can be recorded in digital format on the server S, or only the areas with detected, first and/or second events A through H. The server can e.g. also be provided centrally by a provider for the provision of this replay data lying in the past, whereby e.g. an operator of the system can access the server S by means of a secured assembly/computer with corresponding client. The recording is done in such a way that an event range A to H is stored either as a single file or in multiple files each representing an event sub-range. The number of recordings of the replay data areas and the resulting files may vary depending on the number of users who are to have subsequent access to them. Regardless, the number of records of the real-time analysis data stream (replay data streams) may depend on the recording and data delivery technology used. For example, these files, once recorded, may also be retrieved by means of a digital subscriber line or other uniquely assignable data transmission from the BG assembly or other designated receiver with a unique address and played back on a multimedia device MG, such as a monitor or computer. For example, the assembly BG may also be integrated into the corresponding device in the case of a mobile multimedia device, such as a cell phone, a PDA, a tablet PC. Immediately after the real-time recording of the replay data stream, the recorded ranges of the respective detected events or the respective time ranges or set time tags can be retrieved by the user.

At time $t_C$ this event area is completely recorded on the server S and made available for its retrieval. Parts of this event area may already be retrievable immediately after the start of their recording and/or detection, provided they are in the past. The user selecting this event area receives this event area C in digital format displayed in real time on the monitor MG via the client of the assembly. Pausing, rewinding or forwarding (if a past portion of the replay data stream has been accessed) may also be possible for monitoring the replay data stream via the client. All following time ranges of the replay data stream run for the user then e.g. when pausing by the length of the pause, time-shifted to the real time replay data stream. It is of course possible for the user to jump back to the real time mode of monitoring the analysis data stream at any time. In this case, parts of the replay data stream are skipped again accordingly. For already detected event areas of the replay data stream, it is also possible to download the desired event area A-H as a file and then view it. However, the download time can be very time-consuming depending on the available bandwidth for data transfer. Furthermore, the download time can be significantly extended if additional event areas or the real-time stream are viewed/monitored at the same time. In general, the replay embodiment may be designed, for example, to use a new method for providing replay data via an assembly BG associated with a multimedia device MG having a corresponding client. The entire replay data stream is recorded on the server S. As an embodiment, also only the detected first and/or second event regions can be stored. Then the steps are performed: a) selecting, by means of the client supported by the assembly (BG), one or more event areas and/or time ranges and/or selectable time tags or time markers in the stored replay data stream at the multimedia device (MG); b) retrieving, based on the previous selection, one or more time ranges based on their unique identification (in terms of time or content (e.g. detected anomalies or replay data ranges filtered by means of a filter through entered characteristic parameters)). During the transmission also several multimedia data files could represent in each case an event/time range and their markings thereby in each case an unambiguously subrange-specific marking covers to the call of the server (S) on in each case the time/anomaly ranges (A to H) is stored; c) providing a time range of the recorded replay data stream stored in the data files at the multimedia device (MG) starting with the selected event range or sub-range with a time delay which is at least as large as the difference between the actual real-time analysis data stream and the selection time.

| List of reference signs |
|---|
| 1 Open modular cross-data system |
| 10 Central digital platform |
| 101 Network Interface |
| 102 Data Pre-processing module |
| 103 Data Processing module |
| 104 Access Control Unit |
| 1041 Access Control Parameter |
| 11 Persistance storage |
| 111 Modular Digital Individuals/Objects Data Elements |
| 112 Fenced Data Space |
| 112i Fenced Data Space of unit 12i |
| 112i1 Uploaded data |
| 112i2 Standardized data |
| 112i3 Normalized data |
| 112i4 Enriched data |

-continued

| List of reference signs |
|---|
| 112i5 Shared data/Anonymized data |
| 12i Units |
| 12i1 Sensory (input devices and sensors) (e.g. IoT Sensory) |
| 12i2 Network-enabled devices |
| 13 Data transmission network |
| 14 Secure network/Controlled Network Access |
| 15 Groups comprising assigned units of users 12i |
| 151 Hierarchical group allocation |
| 2 Automated digital processes |
| 21 Loss Analytics and Programme Optimization |
| 22 Property Exposure Management |
| 23 Employee Health Programmes |
| 24 Policy, Certificate, Exposure and Claims Management |
| 25 Supply Chain Resilience |
| 26 Sustainability Solutions |
| 3 Real-world Individual or Object |
| 31 Physical Object |
| 32 Intangible Object |
| 33 Living Object |
| 331 Human Being |
| 332 Animal |
| 34 Subsystems of the Real-world Individual or Object |
| 341, 342, 343, . . . , 34i Subsystems 1, . . . , i |
| 35 Subsystems and Components of the Ecosystem |
| 351, 352, 353, . . . , 35i Subsystems 1, . . . , i |
| 4 Digital Risk Twin (autonomous) |
| 41 Digital Intelligence Layer |
| 411 Machine Learning |
| 412 Neural Network |
| 42 Property Parameters of Real-World Individual or Object |
| 43 Status Parameters of Real-World Individual or Object |
| 431 Structural Status Parameters |
| 432 Operational Status Parameters |
| 433 Environmental Status Parameters |
| 44 Data Structures Representing States of Each of the Plurality of Subsystems of the Real-World Individual or Object |
| 45 Digital Risk Twin |
| 451 Simulation |
| 452 Synchronization |
| 453 Twin Linking: Sensory/Measuring/Data Acquisition |
| 46 Digital Ecosystem Replica Layer |
| 461, 462, 463, . . . , 46i Virtual Subsystems of Twinned Ecosystem |
| 47 Digital Twin |
| 471 Simulation |
| 472 Synchronization |
| 473 Twin Linking: Sensory/Measuring/Data Acquisition |
| 48 Digital Individuals/Object Replica Layer |
| 481, 482, 483, . . . , 48i Virtual Subsystems of Twinned Real-World Individuals/Object |
| 5 Ecosystem - Environment - Interaction between Real-world Individuals/Objects |

The invention claimed is:

1. An open scalable and modular cross-data system providing a standardized secured data aggregator, comprising:

a central digital platform, implemented by first processing circuitry, for interlinking sensitive risk-related data; and a plurality of units, implemented by second processing circuitry, wherein the system provides controlled data-driven or process-driven cross-data interaction between different units and the central digital platform, the units have associated heterogeneous data sources or data measuring or capturing devices associated with real-world objects or individuals and use one or more network-enabled devices to access the central digital platform by a secure network, each of the units has an assigned authentication, authorization, and group allocation within the system providing a controlled network access to the central digital platform and a fenced data space of a persistence storage of the central digital platform for each of the units via the secure network, the central digital platform includes a network-interface for secure bidirectional data transmission between the central digital platform and one of the units, all data transmissions and communications between the one of the units and the central digital platform are hosted in the fenced data space associated with the one of the units uploading and assessing data via the network-enabled devices of the one of the units and the network-interface for data pre-processing and processing by central digital platform, the data transmissions and communications comprising periodically scheduled data transmission pipelines or data streaming transmitting data continuously or periodically generated by different sources, the central digital platform includes an access control unit, wherein access parameter values for access to a fenced data space as secure environment of a unit are settable by the unit of said fenced data space individually and hierarchically defining access level to at least parts of data of the fenced data space for single units or groups of units or the central digital platform's use as anonymized data, uploaded data is standardized and normalized and enriched by the central digital platform providing uniform access to each of the units to its data, enrichment of the data comprising processing or enhancing transferred data of a unit using data linked to anonymized data associated with fenced data spaces of other units, the central digital platform includes standardized digital twin structures available throughout an entire lifecycle of the real-world object or individual, the standardized digital twin structures providing an individual/object replica with an artificial intelligence of an individual/object physical entity in the central digital platform, the standardized digital twin structures are fed by real-time or quasi real-time data captured via the secure bidirectional data transmission, parameter evolution of at least one of the standardized digital twin structures corresponds to the physical object or individual at any given point in time, each standardized digital twin structure comprises a definable threshold value for a capture latency given by a maximum latency time value of digital twin parameter values and actual real-time parameter values of the physical object or individual, and the central digital platform executes (i) a monitoring process to monitor a condition of a selected portion of a twinned physical object or individual based on sensed values of designated parameters, and (ii) an assessing process to generate and propagate time-series of forward-looking measuring values of the selected portion of the twinned physical object or individual based on the sensed values of the designated parameters to a definable future time-window.

2. The system according to claim 1, wherein each of the units includes defined unit-specific data- and process-access parameters and defined group-specific data- and process-access parameters, and groups within the group allocation at least includes insured unit or broker unit or insurer or risk analysis provider data- and process-access parameters.

3. The system according to claim 1, wherein the uploaded data is enriched at least by replenishment of object or unit data by geographic latitude or longitude parameter values, and the geographic latitude or longitude parameter values of the object or unit is used to automatically generated exposure parameter values associated with the object or unit.

4. The system according to claim 1, wherein the uploaded data is enriched by processing or enhancing transferred data of the one of the units using by data linked to enriched or pre-processed data or data from additional sources.

5. The system according to claim 4, wherein the additional sources include anonymized data associated with fenced data spaces of others of the units.

6. The system according to claim 1, wherein data captured by the central digital platform from the periodically scheduled data transmission pipelines or the data streaming are processed by the central digital platform incrementally using stream processing techniques without having access to all of data generated by various different data sources.

7. The system according to claim 1, wherein the central digital platform includes a monitoring unit for detecting any concept drift occurring in the data pre-processing and processing by central digital platform based on any detected changes in properties of a stream or pipeline over time.

8. The system according to claim 1, wherein data captured in the fenced data space of the one of the units at least includes exposure linked data associated with the one of the units.

9. The system according to claim 8, wherein the central digital platform includes a data processing module providing exposure-based forecasts or process optimization by parameter feedback based on the captured data of data transmission pipelines or the data streaming and the parameter values of the at least one of the standardized digital twin structures.

10. The system according to claim 1, wherein the central digital platform includes an automated digital process for automated loss analytics and automated process optimization or for providing parameter-based indication of present of future loss trends or automated structuring or assembling of optimized risk-transfer structures based on the captured data of data transmission pipelines or the data streaming and the parameter values of the at least one of the standardized digital twin structures.

11. The system according to claim 1, wherein the central digital platform provides automated property exposure management and automated visualization of property portfolio and risk exposures based on the captured data of data transmission pipelines or the data streaming and the parameter values of the at least one of the standardized digital twin structures.

12. The system according to claim 1, wherein the central digital platform provides employee health risk-transfer structures or processes or programs facilitating automated analysis of complex impact of risks on employee health programs or risk-transfer structures based on the captured data of data transmission pipelines or the data streaming and the parameter values of the at least one of the standardized digital twin structures.

13. The system according to claim 1, wherein the central digital platform provides automated policy or certificate or exposure or claims management by automated capturing and automated managing of risk-relevant data and documents via data transmission pipelines or the data streaming and the parameter values of the at least one of the standardized digital twin structures.

14. The system according to claim 1, wherein the central digital platform provides automated supply chain resilience by automatically generating one or more digital twin structures of production and supplier networks to be covered or fenced by risk mitigation based on the captured data of data transmission pipelines or the data streaming and the parameter values of the at least one of the standardized digital twin structures.

15. The system according to claim 1, wherein the central digital platform provides automated sustainability solutions or automated compiling of sustainability metrics and tracking based on the captured data of data transmission pipelines or the data streaming and the parameter values of the at least one of the standardized digital twin structures.

16. The system according to claim 1, further comprising:

one or more sensors configured to sense or measure measuring values of one or more designated parameters of the twinned physical object or individual;

a processor-driven core engine, implemented by the first processing circuitry, configured to:

receive data associated with the one or more sensors; and a data transmission interface coupled to the core engine configured to transmit information associated with a result generated by the core engine, wherein the one or more sensors are configured to sense or measure measuring values of the one or more designated parameters and the core engine is configured to execute at least one of the monitoring and assessing processes, when the twinned physical object or individual time-dependently changes or propagates.

17. The system according to claim 1, wherein the central digital platform includes a data-loopback structure, and data of the units are processed automatically, generating risk analysis parameter values being feed back to the system for use by the system or the units or the enrichment of the data.

* * * * *